`US012207233B2`

(12) United States Patent
Ye et al.

(10) Patent No.: US 12,207,233 B2
(45) Date of Patent: Jan. 21, 2025

(54) WIRELESS RESOURCE ALLOCATION SCHEMES IN VEHICLE-TO-EVERYTHING (V2X) COMMUNICATION

(71) Applicant: INTERDIGITAL PATENT HOLDINGS, INC., Wilmington, DE (US)

(72) Inventors: Chunxuan Ye, San Diego, CA (US);
Fengjun Xi, San Diego, CA (US);
Hanqing Lou, Syosset, NY (US); Kyle Jung-Lin Pan, Saint James, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 619 days.

(21) Appl. No.: 17/421,891

(22) PCT Filed: Jan. 9, 2020

(86) PCT No.: PCT/US2020/012949
§ 371 (c)(1),
(2) Date: Jul. 9, 2021

(87) PCT Pub. No.: WO2020/146645
PCT Pub. Date: Jul. 16, 2020

(65) Prior Publication Data
US 2022/0124679 A1 Apr. 21, 2022

Related U.S. Application Data

(60) Provisional application No. 62/790,312, filed on Jan. 9, 2019.

(51) Int. Cl.
*H04B 17/318* (2015.01)
*H04W 24/10* (2009.01)
(Continued)

(52) U.S. Cl.
CPC .......... *H04W 72/02* (2013.01); *H04B 17/318* (2015.01); *H04W 24/10* (2013.01);
(Continued)

(58) Field of Classification Search
None
See application file for complete search history.

(56) References Cited

U.S. PATENT DOCUMENTS 10,157,539 B1 * 12/2018 Hoover ................. H04W 4/027
10,531,460 B2    1/2020 Chae et al.
(Continued)

FOREIGN PATENT DOCUMENTS

EP         3550905 A1    10/2019
WO   WO-2017126950 A1 *  7/2017 ............ H04W 72/04
(Continued)

OTHER PUBLICATIONS

Huawei et al., "Sidelink resource allocation mode 2," 3GPP TSG RAN WG1 Meeting #95, R1-1812209, Spokane, USA (Nov. 12-16, 2018).
(Continued)

*Primary Examiner* — Joseph E Avellino
*Assistant Examiner* — Charles E Eckholdt
(74) *Attorney, Agent, or Firm* — VOLPE KOENIG

(57) ABSTRACT

Methods, devices, and systems for resource allocation are disclosed herein. Specifically, a wireless transmit receive unit (WTRU) may measure a reference signal received power (RSRP) level and a received signal strength indicator (RSSI) value of one or more resources in each of a plurality of patterns. The WTRU may exclude, from the selection, each pattern for which at least one resource in the pattern is reserved by another WTRU and has an RSRP greater than a threshold. On a condition that at least one of the plurality of patterns is not excluded, the WTRU may select a pattern
(Continued)

with a lowest pattern RSSI value and a one or more resources satisfying a quality of service (QoS) requirement of data of the WTRU. The WTRU may then transmit the data of the WTRU using the selected pattern.

12 Claims, 13 Drawing Sheets

(51) Int. Cl.
      H04W 72/02      (2009.01)
      H04W 72/20      (2023.01)
      H04W 72/542    (2023.01)
      H04W 72/56      (2023.01)

(52) U.S. Cl.
      CPC ......... *H04W 72/20* (2023.01); *H04W 72/542* (2023.01); *H04W 72/56* (2023.01)

(56) References Cited

U.S. PATENT DOCUMENTS

| | | | |
|---|---|---|---|
| 11,102,631 B2 | 8/2021 | Zhang et al. | |
| 2006/0153141 A1* | 7/2006 | Hirano | H04W 56/0035 370/335 |
| 2018/0206140 A1 | 7/2018 | Panteleev et al. | |
| 2018/0279275 A1* | 9/2018 | Chen | H04W 72/23 |
| 2021/0014831 A1* | 1/2021 | Ryu | H04W 72/02 |
| 2021/0084656 A1* | 3/2021 | Feng | H04W 74/0816 |
| 2021/0368312 A1* | 11/2021 | Zhang | H04W 84/005 |

FOREIGN PATENT DOCUMENTS

| | | | | |
|---|---|---|---|---|
| WO | WO-2018135905 A1 * | 7/2018 | | H04L 5/001 |
| WO | 2018175553 A1 | 9/2018 | | |
| WO | WO-2019027304 A1 * | 2/2019 | | H04L 1/1628 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

Interdigital Inc., "NR Sidelink Resource Allocation Mechanism for Mode 2," 3GPP TSG RAN WG1 #96bis, R1-1905402, Xi'an, China (Apr. 8-12, 2019).

Interdigital Inc., "NR Sidelink Resource Allocation Mechanism for Mode 2," 3GPP TSG RAN WG1 #97, R1-1907094, R1-1907094 (May 13-17, 2019).

Interdigital Inc., "Sidelink Resource Allocation Mechanism for NR V2X," 3GPP TSG RAN WG1 #96, R1-1902598, Athens, Greece (Feb. 25-Mar. 1, 2019).

Nokia et al., "On Sidelink Resource Allocation," 3GPP TSG-RAN WG1 Meeting #95, R1-1813522, Spokane, USA (Nov. 12-16, 2018).

Oppo, "Discussion on mode 2 resource allocation in NR-V2X," 3GPP TSG-RAN WG1 Meeting #95, R1-1812827, Spokane, USA (Nov. 12-16, 2018).

Third Generation Partnership Project, "Technical Specification Group Radio Access Network; Evolved Universal Terrestrial Radio Access (E-UTRA); Multiplexing and channel coding (Release 15)," 3GPP Ts 36.212 V15.0.1 (Jan. 2018).

Third Generation Partnership Project, "Technical Specification Group Radio Access Network; Evolved Universal Terrestrial Radio Access (E-UTRA); Multiplexing and channel coding (Release 15)," 3GPP Ts 36.212 V15.3.0 (Sep. 2018).

Third Generation Partnership Project, "Technical Specification Group Radio Access Network; NR; Physical channels and modulation (Release 15)," 3GPP TS 38.211 V15.3.0 (Sep. 2018).

Third Generation Partnership Project, "Technical Specification Group Radio Access Network; NR; Physical channels and modulation (Release 15)," 3GPP TS 38.211 V15.7.0 (Sep. 2019).

Third Generation Partnership Project, "Technical Specification Group Radio Access Network; NR; Multiplexing and channel coding (Release 15)," 3GPP TS 38.212 V15.3.0 (Sep. 2018).

Third Generation Partnership Project, "Technical Specification Group Radio Access Network; NR; Physical layer procedures for control (Release 15)," 3GPP TS 38.213 V15.3.0 (Sep. 2018).

Third Generation Partnership Project, "Technical Specification Group Radio Access Network; NR; Physical layer procedures for data (Release 15)," 3GPP TS 38.214 V15.3.0 (Sep. 2018).

Third Generation Partnership Project, "Technical Specification Group Radio Access Network; NR; Physical layer procedures for data (Release 15)," 3GPP TS 38.214 V15.7.0 (Sep. 2019).

Third Generation Partnership Project, "Technical Specification Group Radio Access Network; NR; Physical layer procedures for control (Release 15)," 3GPP TS 38.213 V15.7.0 (Sep. 2019).

Third Generation Partnership Project, "Technical Specification Group Radio Access Network; NR; Multiplexing and channel coding (Release 15)," 3GPP TS 38.212 V15.7.0 (Sep. 2019).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.8.0 (Dec. 2019).

* cited by examiner

WIRELESS RESOURCE ALLOCATION SCHEMES IN VEHICLE-TO-EVERYTHING (V2X) COMMUNICATION

CROSS-REFERENCE TO RELATED APPLICATIONS

This application is the U.S. National Stage, under 35 U.S.C. § 371, of International Application No. PCT/US2020/012949, filed Jan. 9, 2020, which claims the benefit of U.S. Provisional Application No. 62/790,312, filed on Jan. 9, 2019, the contents of which are hereby incorporated herein by reference.

BACKGROUND

Generally, in any wireless communication system there may be a plurality of wireless devices, and these wireless devices may need to send and receive information between one or more other wireless devices. In order to achieve the successful transmission of information between wireless devices, and to prevent communication interference, there needs to be an efficient way of organizing and sharing the available resources in the a given wireless communication systems. There is a need for allocating the resources that are available between all wireless devices so that communication can occur in a shared and efficient manner.

In recent 3rd Generation Partnership Project (3GPP) standards discussions, several deployment scenarios are defined, such as, for example, indoor hotspot, dense urban, rural, urban macro, high speed and the like. On top of these deployment scenarios, three use cases are defined: enhanced mobile broadband (eMBB), massive machine type communications (mMTC) and ultra-reliable and low latency communications (URLLC). Different use cases may focus on different requirements such as higher data rate, higher spectrum efficiency, low power and higher energy efficiency, lower latency and higher reliability.

Vehicle-to-everything (V2X) communication architecture has been developed for wireless communication systems, including Long Term Evolution (LTE) systems and fifth generation (5G) systems. V2X communications may include one or more of vehicle-to-vehicle (V2V) communications, vehicle-to-pedestrian (V2P) communications, vehicle-to-infrastructure (V2I) communications and vehicle-to-network (V2N) communications.

SUMMARY

Methods, devices, and systems for resource allocation are disclosed herein. Specifically, a wireless transmit receive unit (WTRU) may measure a reference signal received power (RSRP) level and a received signal strength indicator (RSSI) value of one or more resources in each of a plurality of patterns. The WTRU may exclude, from the selection, each pattern for which at least one resource in the pattern is reserved by another WTRU and has an RSRP greater than a threshold. On a condition that at least one of the plurality of patterns is not excluded, the WTRU may select a pattern with a lowest pattern RSSI value and a one or more resources satisfying a quality of service (QoS) requirement of data of the WTRU. The WTRU may then transmit the data of the WTRU using the selected pattern.

In a further example, on on a condition that all of the plurality of patterns are excluded, the WTRU may select an excluded pattern associated with the lowest data priority, wherein the lowest data priority is lower than a priority of the data of the WTRU. Also, the WTRU may receive a configuration of the plurality of patterns, in a further example. Additionally or alternatively, the WTRU may be preconfigured with the plurality of patterns.

In another example, the WTRU may decode sidelink control information (SCI) of one or more other WTRUs. In an additional example, the plurality of patterns may be for sidelink transmission.

In an additional example, each pattern RSSI value of each the plurality of patterns may be a representative value of an associated pattern. Also, the pattern RSSI values may be determined based on an average of RSSI values for resources in the associated pattern. Further, the pattern RSSI values may be determined based on a maximum of RSSI values for resources in the associated pattern. Moreover, the pattern RSSI values may be determined based on a minimum of RSSI values for resources in the associated pattern.

BRIEF DESCRIPTION OF THE DRAWINGS

Furthermore, like reference numerals in the figures indicate like elements, and wherein.

DETAILED DESCRIPTION

Figure 1A:
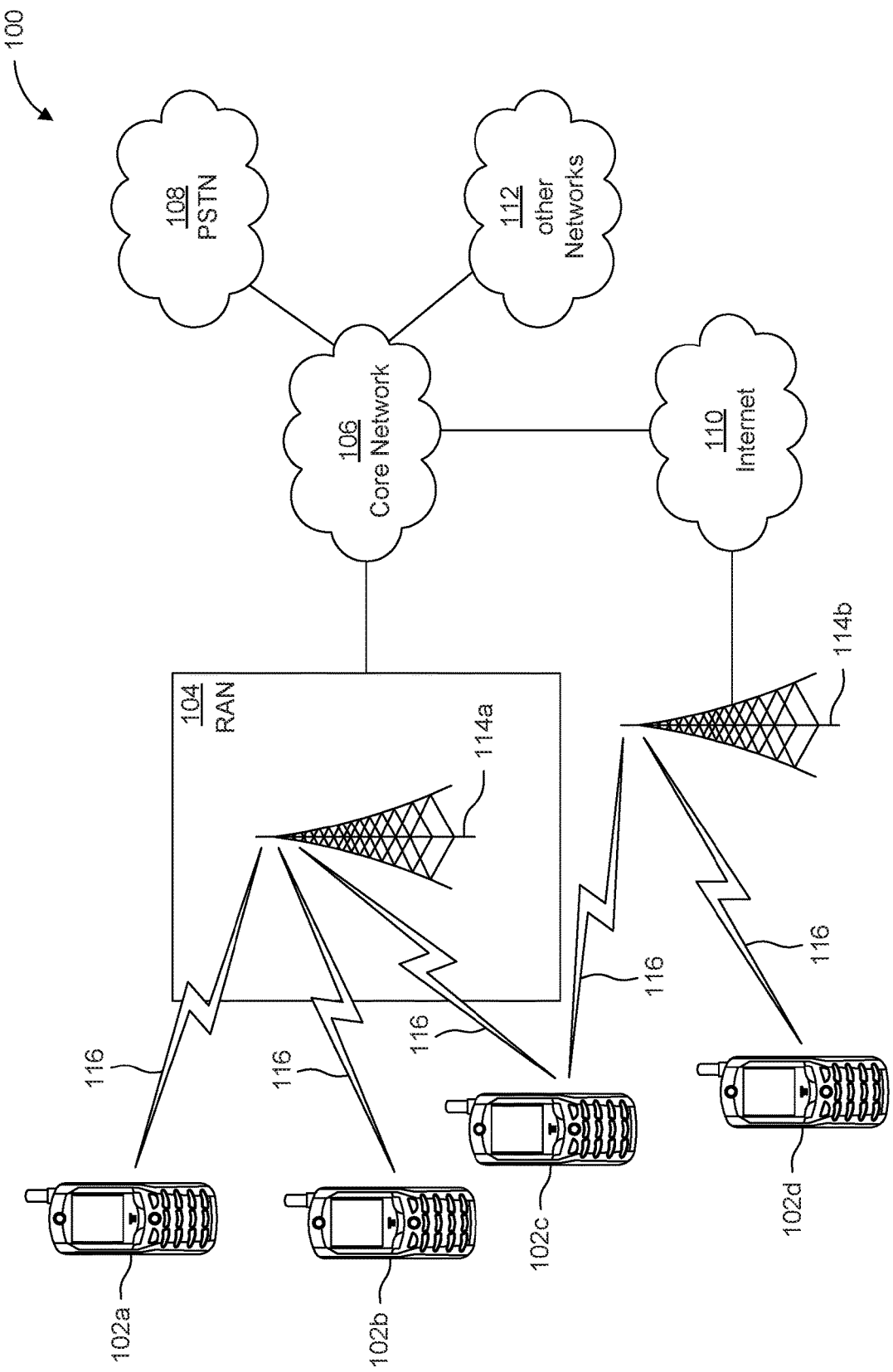
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
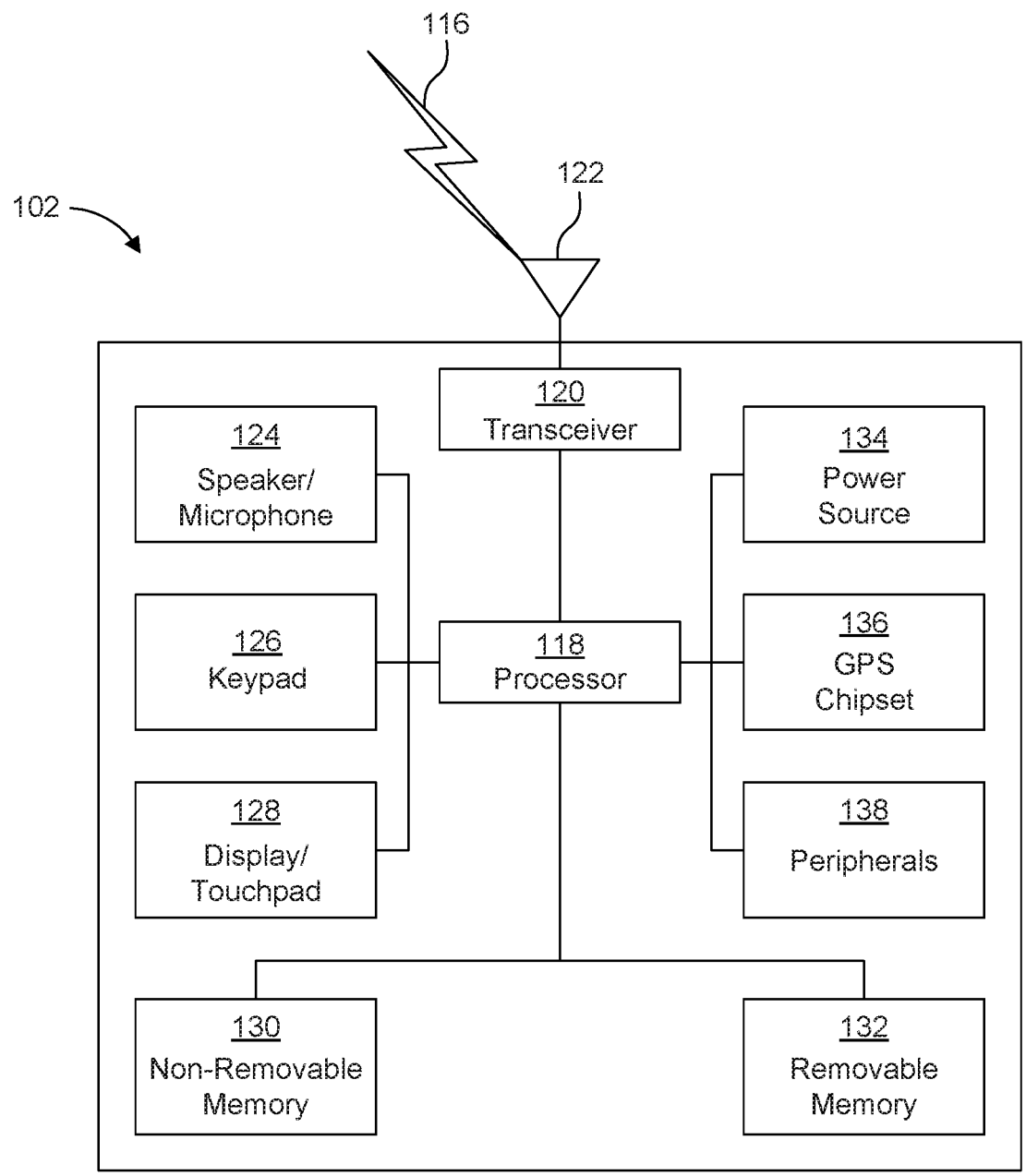
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception)).

Figure 1C:
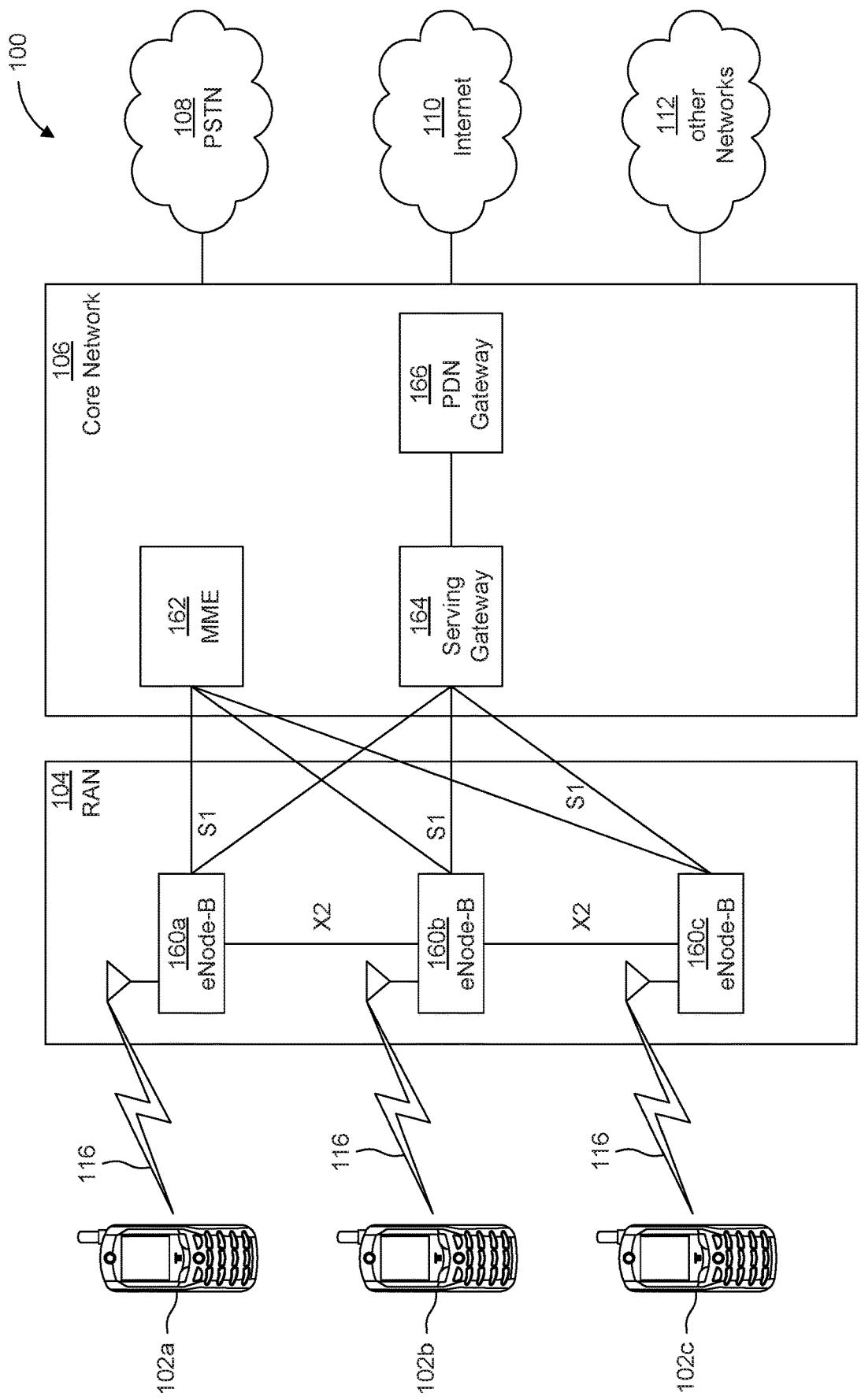
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (for example, 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
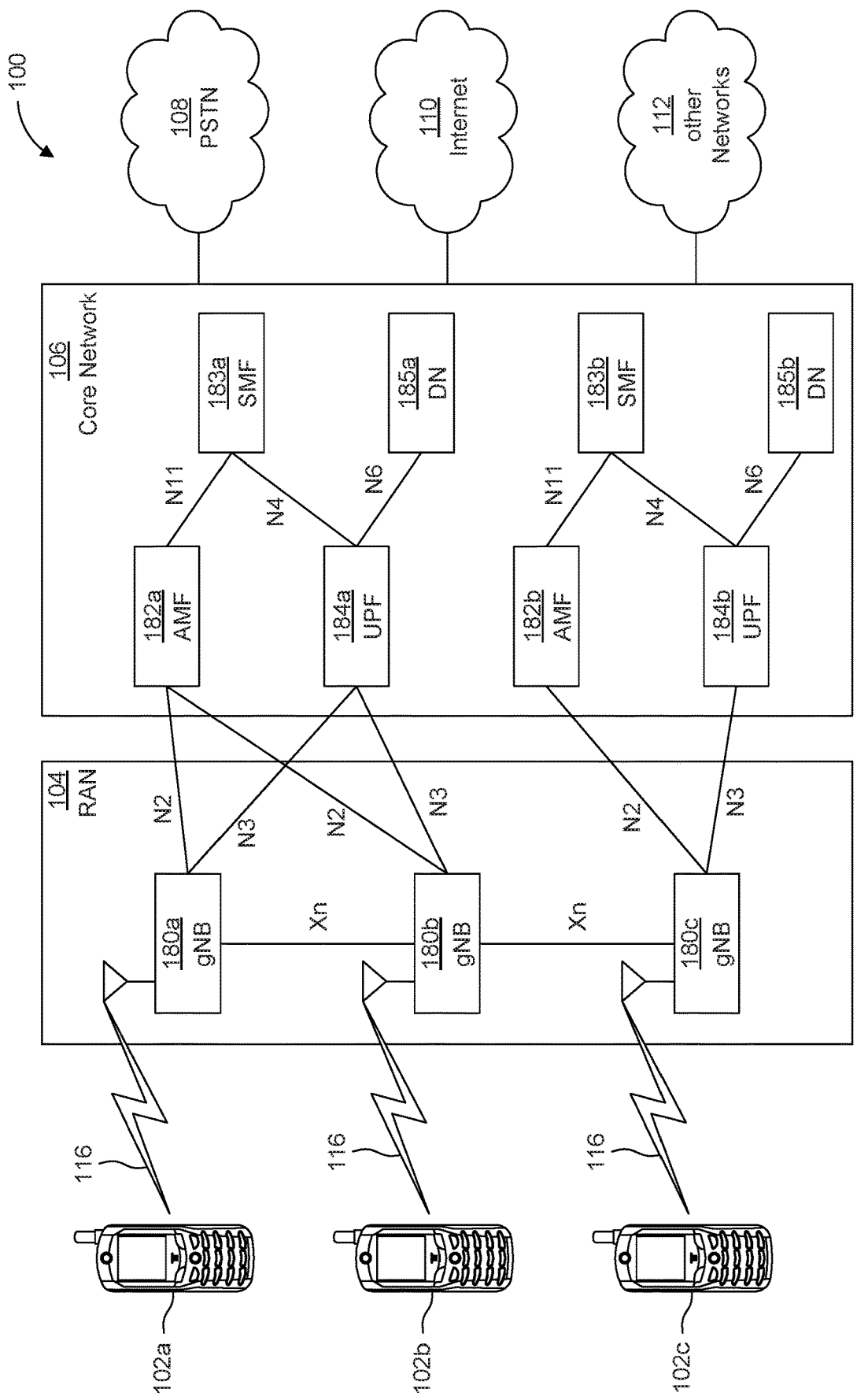
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (for example, containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3rd Generation Partnership Project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

In recent 3GPP standards discussions, several deployment scenarios are defined, such as, for example, indoor hotspot, dense urban, rural, urban macro, high speed and the like. On top of these deployment scenarios, three use cases are defined: enhanced mobile broadband (eMBB), massive machine type communications (mMTC) and ultra-reliable and low latency communications (URLLC). Different use cases may focus on different requirements such as higher data rate, higher spectrum efficiency, low power and higher energy efficiency, lower latency and higher reliability.

Vehicle-to-everything (V2X) communication architecture has been developed for wireless communication systems, including LTE systems and 5G systems. V2X communications may include one or more of vehicle-to-vehicle (V2V) communications, vehicle-to-pedestrian (V2P) communications, vehicle-to-infrastructure (V2I) communications and vehicle-to-network (V2N) communications.

In 3GPP LTE V2X, there may be one or more transmission modes, such as a vehicle may be in transmission mode 3, for example, a mode 3 user, or may be in transmission mode 4, for example, a mode 4 user. A mode 3 user may directly use the resources allocated by a base station for sidelink (SL) communication among vehicles or between a vehicle and a pedestrian. A mode 4 user may obtain a list of candidate resources allocated by a base station, and may select a resource among the candidate resources for its SL communication.

In NR V2X there may be one or more transmission modes. In an example, an NR V2X mode 1 user may be similar to the mode 3 user in LTE V2X. In a further example, an NR V2X mode 2 user may include the mode 4 user in LTE V2X. The terms user, UE or WTRU may refer to a vehicle with a user in the vehicle or a vehicle without a user in the vehicle, and these terms may be used interchangeably and still be consistent with the examples and embodiments provided herein.

Concerning LTE V2X control information, downlink control information (DCI) format 5A may be used for the scheduling of a Physical Sidelink Control Channel (PSCCH), as well as several sidelink control information (SCI) format 1 fields used for the scheduling of a Physical Sidelink Shared Channel (PSSCH). The payload of DCI format 5A may include one or more of the following: a carrier indicator, which may be 3 bits; a lowest index of the subchannel allocation to the initial transmission, which may be one or more bits, such as $\lceil \log_2(N_{subchannel}^{SL}) \rceil$ bits; SCI format 1 fields, which may include a frequency resource location of initial transmission and retransmission field, and a time gap between initial transmission and retransmission; and an SL index field, which may be 2 bits and may be present only for cases with time division duplex (TDD) operation with uplink-downlink configurations 0-6. When a format 5A cyclic redundancy check (CRC) is scrambled with an SL-semi-persistent scheduling (SPS)-V2X-radio network temporary identifier (RNTI) (SL-SPS-V-RNTI), one or more of the following fields may be present: an SL SPS configuration index field, which may be 3 bits; and an activation/release indication field, which may be 1 bit.

If the number of information bits in DCI format 5A that are mapped onto a given search space is less than the payload size of format 0 mapped onto the same search space, zeros may be appended to format 5A until the payload size equals that of format 0 including any padding bits appended to format 0.

If the DCI format 5A CRC is scrambled by SL-V-RNTI and if the number of information bits in format 5A that are mapped onto a given search space is less than the payload size of format 5A with CRC scrambled by SL-SPS-V-RNTI mapped onto the same search space and format 0 is not defined on the same search space, then zeros may be appended to format 5A until the payload size equals that of format 5A with CRC scrambled by SL-SPS-V-RNTI.

Concerning LTE V2X control information, SCI format 1 may be used for the scheduling of PSSCH. The payload of SCI format 1 may include one or more of the following: a priority, which may be 3 bits; a resource reservation, which may be 4 bits; a frequency resource location of initial transmission and retransmission, which may be one or more bits, such as $\lceil \log_2(N_{subchannel}^{SL}(N_{subchannel}^{SL}+1)/2) \rceil$ bits; a time gap between initial transmission and retransmission, which may be 4 bits; a modulation and coding scheme (MCS), which may be 5 bits; a retransmission index, which may be 1 bit; and reserved information bits that may be added until the size of SCI format 1 is equal to 32 bits. The reserved bits may be set to zero.

In one example, there may be a method for resource selection for mode 4 in LTE V2X. First, a WTRU may determine a transmission window between times [n+$T_1$, n+$T_2$] by selecting proper $T_1$ and $T_2$ values based on latency requirements. A candidate resource may be denoted by $R_{x,y}$ and the set of candidate resources may be denoted by S. The set of candidate resources may be determined by sensing a received signal strength indicator (RSSI) value. The total number of candidate resources may be $M_{total}$.

Second, a WTRU may determine the set $S_A$ from S based on the reference signal received power (RSRP) level of candidate resources. Specifically, if a candidate resource in S has an RSRP level above a certain threshold, then it may be saved to $S_A$.

Third, a WTRU may remove a resource $R_{x,y}$ from the candidate resource set $S_A$ if it conflicts its own transmissions or other WTRU's reserved resources, for example, mode 3 reserved resources.

Four, if the number of remaining candidate resources in $S_A$ after the third step is no more than $0.2*M_{total}$, then the method may go to the second step with a smaller threshold.

Otherwise, the WTRU may rank the set $S_A$ of resources based on its RSSI values averaged over the past several slots.

Fifth, the WTRU may report the first $0.2*M_{total}$ ranked resources to higher layers for the final resource selection. In an example, $S_B$ may be the reported ranked resources.

In examples, a resource allocation scheme may consider the following aspects. In an example, the resource allocation scheme may be referred to a Mode-2(c). For out of coverage operation, the resource allocation scheme may assume configuration or preconfiguration of single or multiple sidelink transmission patterns. For example, patterns may be defined on each sidelink resource pool. For in-coverage operation, the resource allocation scheme may assume that a gNB configuration may indicate single or multiple sidelink transmission patterns. Again, such patterns may be defined on each sidelink resource pool. Different options may be used for the pattern design in time and frequency for periodic and aperiodic traffic. In an example, if a single pattern is configured for a transmitting WTRU then there may be no sensing procedure executed by the WTRU. In a further example, if multiple patterns are configured for a transmitting WTRU, there may be a possibility of a sensing procedure executed by the WTRU. A pattern may be defined using one or more of the following: a size of the resource(s) in time and frequency; position(s) of the resource(s) in time and frequency; and/or a number of resource(s). Different options may be used for a pattern selection procedure by the WTRU. A time frequency repetition pattern (TFRP) may refer to a resource pattern, a pattern, a group or a resource group, and all of these terms may be used interchangeably in examples and embodiments provided herein.

In one or more examples, for LTE V2X sidelink, most of the traffic is periodic with fixed size. Hence, a WTRU, for example, a mode 3 WTRU or a mode 4 WTRU, may make the sidelink resource reservation with a certain period. For example, the period may be as low as 10 ms in LTE Release 15. Each reserved resource may the same size to fit the fixed size of the traffic payloads.

In NR V2X sidelink, there may be a large amount of traffic that is aperiodic or event-triggered. For periodic traffic, the payload sizes may vary each time or with each transmission. Hence, the resource allocation and reservation may have a different mechanism from LTE V2X. Furthermore, the channel access of each NR mode 2 WTRU may not fully rely on large scaled sensing results, which may be based on the periodic resource reservation.

Further, NR V2X sidelink may support unicast and groupcast, which may require feedback transmissions. For example, the feedback may be in the form of a hybrid automatic repeat request acknowledgement (HARQ-ACK), channel state information (CSI), and the like. Accordingly, there may need to be resource allocation for feedback transmissions.

Overall, new or modified resource allocation and channel access mechanisms may be needed for NR V2X sidelink. Accordingly, examples and embodiments of resource allocation and channel access mechanisms are provided herein.

In one or more examples, sidelink communication may use patterns for a resource allocation scheme. For example, sidelink communication may use patterns for Mode-2(c) resource allocation. In an example, pattern selection may be performed within a period of the configured grant resources.

Figure 2:
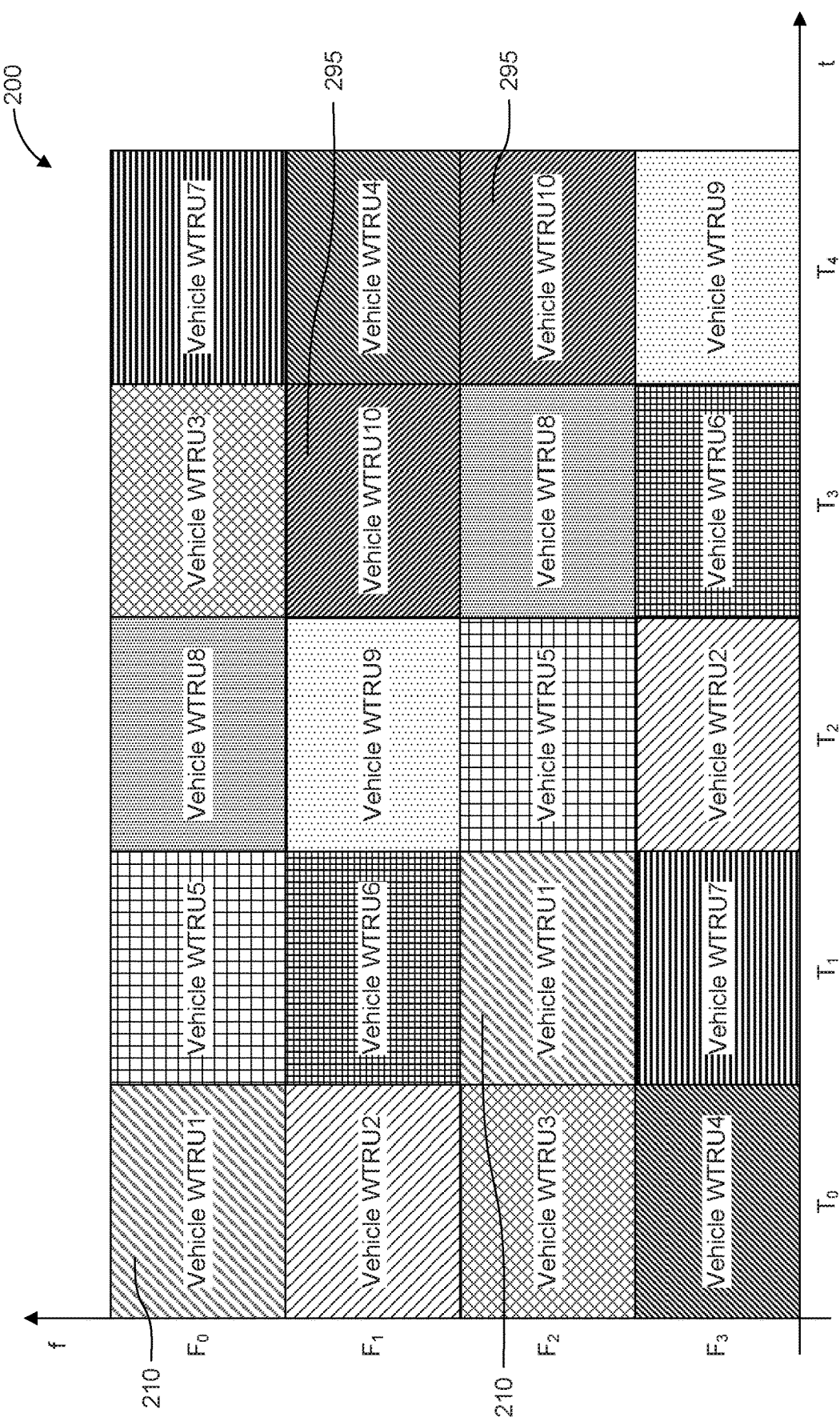
FIG. 2 is a wireless communications resource diagram illustrating an example of a time frequency repetition pattern (TFRP) pool.

FIG. 2 a wireless communications resource diagram illustrating an example of a pattern pool. In an example shown in resource diagram 200, ten patterns may be shown, including a pattern 210 for a first vehicle WTRU at frequency location $F_0$ and time location $T_0$, and frequency location $F_2$ and time location $T_1$. The pool may include further patterns through a pattern 295 for a tenth vehicle WTRU at frequency location $F_1$ and time location $T_3$, and frequency location $F_2$ and time location $T_4$. In an example of transmission repetition, a first transmission for a first vehicle WTRU using pattern 210 may be made at frequency location $F_0$ and time location $T_0$. A second transmission for a first vehicle WTRU using pattern 210 may be made frequency location $F_2$ and time location $T_1$. In a further example, the patterns shown in FIG. 2, such as patterns 210, 295, may be considered to be TFRPs.

Patterns, such as TFRPs, may provide an approach to address half-duplex issues. In other words, WTRUs may use different patterns or different TFRPs to hear each other. However, this approach may have one or more of the following issues that may be addressed herein.

For example, with multiple pattern configurations, WTRUs may select one to perform repetition transmission. However, if multiple WTRUs select the same pattern configuration, for example, a first pattern, then both initial transmission and retransmission will collide. As an example, if multiple WTRUs select the same TFRP configuration, for example, TFRP1, then both initial transmission and retransmission will collide. Accordingly, there may be an issue of how to avoid such a collision due to the same pattern or TFRP selection from multiple WTRUs.

In a further example, a transmissions from different WTRUs may have different QoS requirements, payload sizes, MCSs, and repetition schemes. Accordingly, more flexible designs may be needed.

In another example, the pattern scheme may be applied to a Sidelink Feedback Control Information (SFCI) transmission. In an additional example, the pattern scheme may be applied to a standalone SCI transmission. Further, although vehicle WTRUs may be used in embodiments, examples and solutions provided herein, the embodiments, examples and solutions provided may apply to any type of WTRU and not just vehicle WTRUs.

In an example, there may be a resource allocation scheme for Physical Sidelink Feedback Channel (PSFCH) transmissions. In an example, the resource allocation scheme may be for mode-2(c). Two NR V2X sidelink resource allocation modes may be defined. In mode 2, a WTRU may determine, and, for example, a base station/network may not schedule, sidelink transmission resource(s) within sidelink resources configured by the base station/network or pre-configured sidelink resources. In mode-2(c), a WTRU may be configured with an NR configured grant for sidelink transmission. In an example, the NR configured grant may be a type-1 like configured grant.

In mode 2c, each WTRU may be configured with one or more patterns or TFRPs. The pattern or TFRP may be defined with the size of resource(s) in time and frequency, the position(s) of the resource in time and frequency, and/or the number of resources.

The pattern or TFRP may be defined for PSCCH/PSSCH transmissions. Unlike LTE V2X, the NR V2X sidelink may supports unicast, groupcast, and broadcast. For sidelink unicast and groupcast, feedback may be required to achieve higher spectrum efficiency. As discussed herein, there may be one or more embodiments of a pattern or patterns for feedback transmissions or PSFCH transmissions. There may several ways to define and specify a pattern or TFRP for PSFCH transmissions.

In an example case, a pre-configuration of a PSFCH pattern index may be used. For example, like the PSCCH/

PSSCH, the pattern for the PSFCH may be pre-configured for each WTRU independent of the pattern configurations for a PSCCH, a PSSCH or both. In examples, the pattern may be a TFRP.

Each WTRU may be preconfigured with one or more patterns. If the WTRU is operating in an Out-Of-Coverage (OOC) scenario, it may use a preconfigured pattern index for any sidelink data it receives. The preconfigured pattern index may be associated with a preconfigured resource pool.

The PSFCH pattern index may be configured by a gNB for each WTRU via dedicated radio resource control (RRC) messages. An exemplary RRC message for a PSFCH pattern configuration may be an RRC Connection Reconfiguration. This configured PSFCH pattern index may replace the preconfigured PSFCH pattern index. Further, the configured pattern index may be selected from a list of preconfigured pattern indexes. The configured PSFCH pattern index may be independent of the configured or preconfigured PSCCH/PSSCH pattern indexes.

Figure 3:
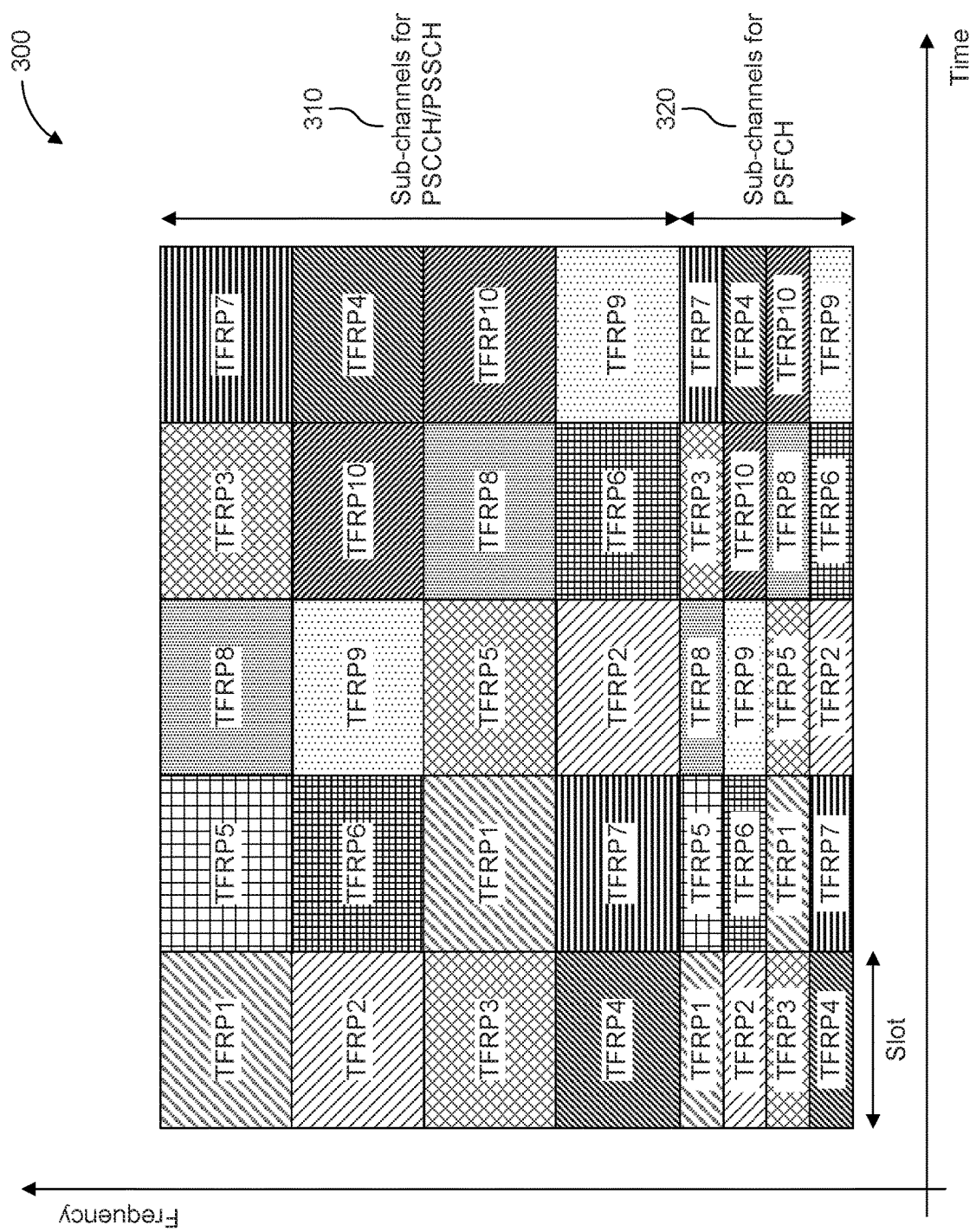
FIG. 3 is a wireless communications resource diagram illustrating an example of Physical Sidelink Control Channel (PSCCH)/Physical Sidelink Shared Channel (PSSCH) TFRP and Physical Sidelink Feedback Channel (PSFCH) TFRP configurations in a resource pool.

FIG. 3 is a wireless communications resource diagram illustrating an example of PSCCH/PSSCH TFRP configurations and PSFCH TFRP configurations in a resource pool. In examples shown in resource diagram 300, the frequency domain may include sub-channels for PSCCH transmission, PSSCH transmission or both 310 and sub-channels for PSFCH transmission 320. For example, a WTRU may be preconfigured with PSFCH TFRP1, TFRP2 and TFRP3. In a further example, a WTRU may be configured with PSCCH/PSSCH TFRP1, but simultaneously configured with PSFCH TFRP3. In an example, the configured PSFCH TFRP3 may be selected from a preconfigured PSFCH TFRP list, and may be different from a configured PSCCH/PSSCH TFRP index.

In an example case, a PSFCH TFRP index may be associated with a PSCCH/PSSCH TFRP index. Specifically, in one way, the PSFCH resource may be time division multiplexing (TDM) multiplexed with a PSCCH/PSSCH resource. For example, the PSFCH may be allocated as the last symbol(s) of the PSCCH/PSSCH resource in the current slot or previous slot(s).

In another way, the PSFCH resource may be frequency division multiplexing (FDM) multiplexed with a PSCCH/PSSCH resource. For example, a resource pool may have the same number of subchannels for the PSCCH/PSSCH and the PSFCH. The transmission of the PSCCH/PSSCH on the i-th PSCCH/PSSCH subchannel in the j-th slot, may automatically be associated with the i-th PSFCH subchannel in the (j+k)-th slot, where k is a non-negative integer.

In the exemplary PSCCH/PSSCH TFRP configurations and PSFCH TFRP configurations in a resource pool shown in FIG. 3, if a Tx WTRU is configured with PSCCH/PSSCH TFRP1, then the receiving or Rx WTRU may automatically use the PSFCH TFRP1 for feedback transmissions, possibly after k slots.

In one case there may be a transmitting or Tx WTRU indication of the PSFCH TFRP index for a receiving WTRU. Specifically, when a transmitting WTRU sends PSCCH/PSSCH data, it may indicate the PSFCH TFRP for the receiving WTRU. This indication may be contained in SCI. The PSFCH TFRP index may be different from the PSCCH/PSSCH TFRP index. The total number of PSFCH TFRP indexes may be less than the total number of PSCCH/PSSCH TFRP indexes, because not all of the sidelink transmissions may need to have feedback. For example, the sidelink broadcast may not have feedback, but the sidelink groupcast or unicast may optionally have feedback depending on data QoS, congestion conditions, group sizes, and the like.

If the transmitting WTRU indicates the PSFCH TFRP for the receiving WTRU, then the transmitting WTRU may replace any configured PSFCH TFRP or any preconfigured PSFCH TFRP for the receiving WTRU. In other words, the receiving WTRU need to follow the indicated PSFCH TFRP index, which may have a higher priority than configured or preconfigured PSFCH TFRP index.

In one case, a receiving WTRU may decide a PSFCH TFRP based on sensing. Specifically, the receiving WTRU may be configured or preconfigured with several PSFCH TFRP indexes. The receiving WTRU may also receive the PSCCH/PSSCH data from a transmitting WTRU using a certain PSFCH TFRP. Further, the receiving WTRU may select a PSFCH TFRP index from the configured or preconfigured list of PSFCH TFRP indexes or the list of PSFCH TFRP indexes indicted from SCI, based on its sensing. The sensing may exclude several PSFCH TFRP indexes from the configured, preconfigured or indicated PSFCH TFRP list based on its decoding of SCIs, as well as PSFCH channel measurement, for example, sidelink RSSI. The receiving WTRU may then select from the remaining available PSFCH TFRP index. The selection may be performed randomly or based on the ranking of sidelink RSSI of the PSFCH.

In an example, there may be a sidelink configured grant configuration for a resource allocation scheme, such as for mode-2(c). The difference between a sidelink configured grant configuration for NR V2X mode-2(c) and an uplink type-1 configured grant configuration may be described herein. Unlike the NR Uu interface where the time of the start of using a type-1 configured grant configuration is indicated in the configuration, the time of the start of using a configured grant configuration for NR V2X mode 2c may not be indicated in the configuration, since it is hard to estimate when a WTRU needs the resource(s) for sidelink transmissions. Further, the configured grant may not indicate the offset between timing of a configuration RRC message and the timing of resource usage. Also, the configured grant may not indicate the System Frame Number (SFN) of the timing of resource usage.

The configured grant may not contain the MCS index for the sidelink transmissions. When the resource pool is configured with the associated TFRP(s), it may not be possible for gNB to know the sidelink data size and the sidelink channel conditions. Hence, the configured grant may not indicate the MCS index.

A gNB may configure a resource pool with its associated TFRP(s) and allocate a WTRU with certain PSCCH/PSSCH TFRP indexes with RRC messages, in an example.

In an example, the configuration of the Type1-ConfiguredSidelinkGrant may be defined with one or more of the following elements: a TFRP resource period or a list of TFRP components. TFRP resource period may include the time duration of each set of TFRP resources.

The list of TFRP components may include one or more of a TFRP index, one or more TFRP frequency resources, one or more TFRP time resources, or a number of TFRP resources for TB repetition and a TB's associated redundancy version (RV). In an example, an RV may be associated with one or more TBs.

For the TFRP time resource, it may be possible for a TFRP resource to last more than one slot. This may be to support the transmissions of large-sized TB. The slot aggregation may be supported here, where a single TB is processed and filled in the cross-slot resources.

For the number of TFRP resources for TB repetitions and its associated RV, the RV order of the repeated TB transmissions may be configured. This may be to achieve the incremental redundancy (IR)-HARQ gain over Chase combining (CC)-HARQ. In an example, self-decoding redundancy versions may be used in each repeated TFRP resource to ensure that a receiving WTRU which receives a single copy of the RV is still able to decode the TB. For example, the first TFRP resource may be to transmit RV0 of a TB, while the second TFRP resource may be to transmit RV3 of a TB, via the proper low-density parity-check (LDPC) coding. Further, it may also be possible to keep sending RV0, or RV3, in both TFRP resources. If there are more than two repeated TB transmissions, the configuration may be RV0, RV3, RV0, RV3, and so on.

In an example, there may be TFRP design and selection for different data QoS requirements. For example, a single resource pool may be associated with multiple TFRP(s). Further, each resource of a TFRP may have the same frequency size or different frequency sizes. Also, each resource of a TFRP may have the same time unit or different time units. In an example, the time units may be slots. Moreover, each TFRP associated with a single resource pool may have the same number of resources or different numbers of resources. This last case may be used to support different data QoS requirements. For example, for data with a high reliability requirement, a WTRU may select a TFRP with a larger number of resources. Here, there may be different numbers of TFRP resources.

Figure 4:
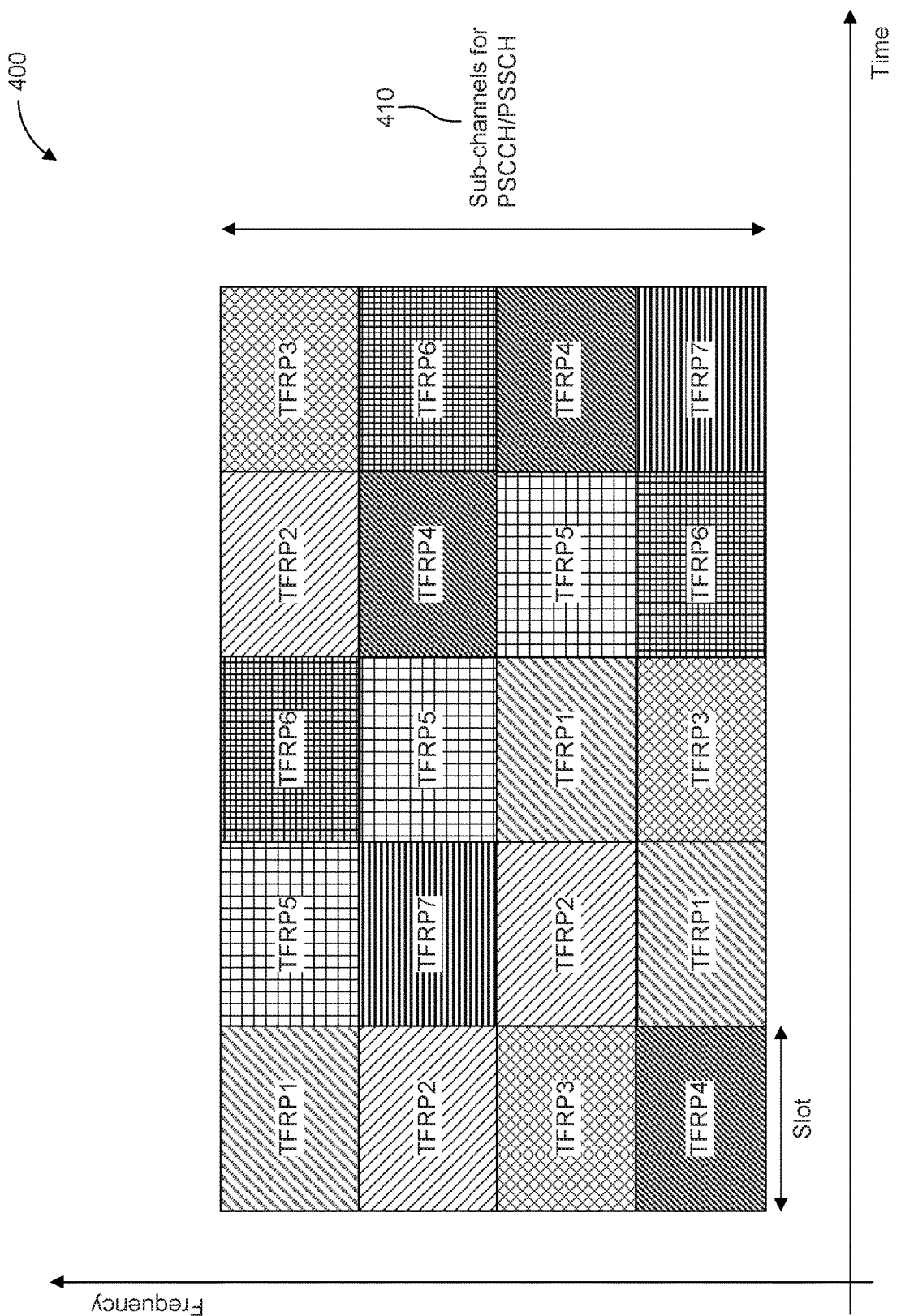
FIG. 4 is a wireless communications resource diagram illustrating an example of TFRP patterns with a different amount of resources.

FIG. 4 is a wireless communications resource diagram illustrating an example of TFRPs with a different amount of resources. In examples shown in resource diagram 400, the frequency domain may include sub-channels for PSCCH transmission, PSSCH transmission or both 410. Each TFRP or pattern may have a different amount of resources, in an example shown in diagram 400. In examples, the amount of resources may be any combination of a number of resources, size of the resources in time and frequency, and position of the resources in time and frequency. Further, in an example in FIG. 4, each TFRP or pattern may have at least one source having a different time unit from any other pattern. For example, each of TFRP1 through TFRP6 may have three resources, while TFRP7 may have only two resources.

Examples of pattern selection procedures are provided herein. In examples, the patterns may be TFRPs. For example, a WTRU may be configured or preconfigured with one or multiple TFRPs associated with a resource pool. When the WTRU has some sidelink data to send, the WTRU may first check how many TFRPs are configured. Further, if only one TFRP is configured, then it may simply use the configured TFRP without any sensing.

If more than one TFRP is configured, then the WTRU may perform sensing for the resources associated with the configured TFRPs. The sensing for the resources may include decoding SCI of other WTRU's sidelink transmissions. By decoding, the WTRU may know which configured TFRP resources are not available. The WTRU may exclude the TFRPs whose resources are reserved by other WTRUs from the list of configured TFRPs.

The sensing for the resources may also include the WTRU measuring the RSRP of the resources in a sensing window. By measuring, the WTRU may exclude TFRPs whose resources have an RSRP lower than a configured threshold.

After the exclusion of the TFRPs, if there are still some remaining TFRPs in the configured TFRP list, then the WTRU may perform one or more of the following action. The WTRU may measure the RSSI value of the sensing window for the resources of the remaining TFRPs. Also, the WTRU may combine the RSSIs of multiple resources of every TFRP. In examples, the combination could be the average of the RSSIs, could be the worst value of the RSSIs, or could be the best value of the RSSIs. Further, the WTRU may select the TFRP with the lowest combined RSSI, whose number of repetitions may satisfy the data reliability requirements.

After the exclusion of the TFRPs, if there is no remaining TFRP in the configured TFRP list, then the WTRU may compare the QoS of its own data with the QoS of the data in the reserved TFRP resource(s). The comparison of QoS may depend on one or more of data priority level, data latency requirements, or data reliability requirements.

If the WTRU's data has higher priority than that associated with one or more reserved TFRP resources, then the WTRU may select the TFRP whose resource reservation is associated with the lowest data priority. Moreover, a similar decision may be applied to the data's latency requirements or reliability requirement(s).

If the WTRU's data does not have higher priority than that associated with one or more reserved TFRP resources, then the WTRU may not transmit. It may then perform the regular sensing. For example, the WTRU may not be restricted to the configured TFRP resources. Also, the WTRU may perform resource selection operations or may request the gNB to schedule the resources for the WTRU's sidelink transmission.

Figure 5:
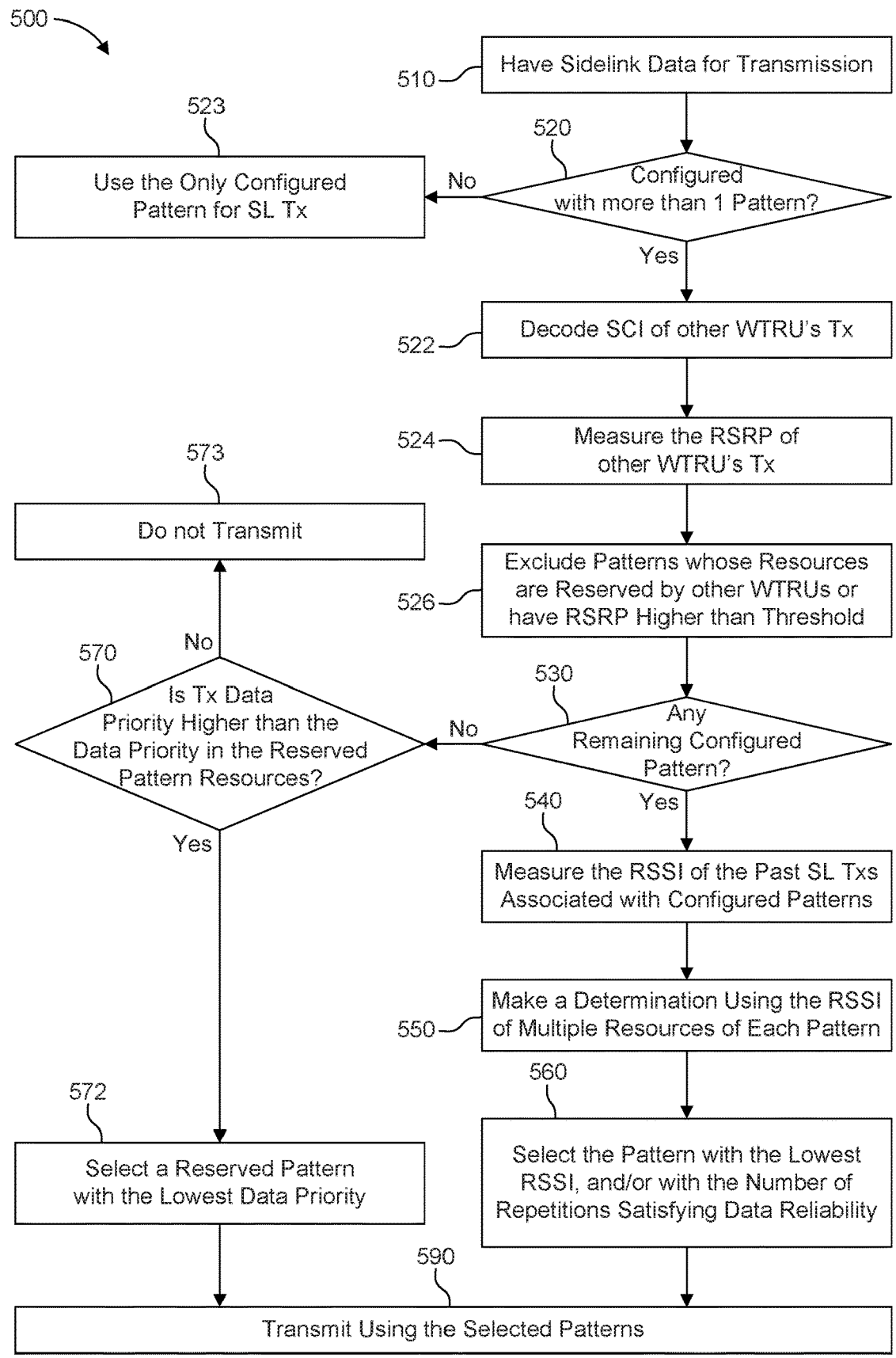
FIG. 5 is a flowchart diagram illustrating an example procedure of a WTRU selecting a pattern from a configured list for sidelink data transmission.

FIG. 5 is a flowchart diagram illustrating an example procedure of a WTRU selecting a pattern from a configured list for sidelink data transmission. In an example shown in flowchart diagram 500, a WTRU may have sidelink data for transmission 510. The WTRU will then determine if it has been configured with more than one pattern 520. If the WTRU has been configured with only one pattern, then then WTRU may use the only configured pattern for sidelink transmission 523. In an example, the WTRU may use the pattern without sensing.

If more than one pattern is configured, then the WTRU may perform sensing for the resources associated with the configured patterns. For example, the WTRU may decode the SCI(s) of one or more other WTRUs' sidelink transmission(s) 522. Accordingly, the WTRU may then determine which configured pattern resources are not available. As a result, the WTRU may exclude the patterns whose resources are reserved by other WTRU(s) from the list of configured patterns. Further, the WTRU may measure the RSRP level of transmission(s) one or more other WTRUs 524. As a result, the WTRU may exclude patterns whose resources are reserved by one or more other WTRU(s) or are used by WTRU(s) whose transmission(s) are higher than a threshold 526.

The WTRU may then determine if there are any remaining patterns 530. If there are still some remaining patterns in the configured pattern list, then the WTRU may measure the RSSI value of the sensing window for the resources of the remaining pattern(s). For example, the WTRU may measure the RSSI of the past sidelink transmissions associated with the remaining patterns 540. The WTRU may then make a determination using the RSSIs of multiple resources of each pattern 550. The determination may be made based on the average of the RSSIs, the minimum of the RSSIs, the maximum of the RSSIs, the worst value of the RSSIs, the best value of the RSSIs, the median of the RSSIs, the mode of the RSSIs or the like. The determination may result in a representative RSSI value for the pattern. Further, the WTRU may then select the pattern with the lowest representative RSSI value and/or the pattern with a number of resources which satisfy QoS requirements for the data 560. In an example, the WTRU may select the pattern with the lowest representative RSSI value whose characteristics satisfy the QoS requirements for the data. For example, the WTRU may select the pattern with the lowest representative RSSI value whose number of repetitions satisfies the data reliability requirements for the data. The WTRU may then proceed to transmit data using the selected pattern(s) 590.

If the WTRU determines there are no remaining patterns, the WTRU may then compare the QoS requirements of the data for transmission by the WTRU to the QoS requirements of the data in the reserved pattern resources. For example, the WTRU may determine if the priority of the data for transmission by the WTRU is higher than the priority of the data in the reserved pattern resources 570. In a similar example, the WTRU may determine if the data latency requirements of the data for transmission by the WTRU is higher than the data latency requirements of the data in the reserved pattern resources. In a further example, the WTRU may determine if the data reliability requirements of the data for transmission by the WTRU is higher than the data reliability requirements of the data in the reserved pattern resources.

If the comparison of QoS requirements favors the WTRU data, the WTRU may then select a reserved pattern with the least stringent QoS characteristics. For example, if the WTRU's data has higher priority than that associated with a reserved pattern resource, then the WTRU may then select a reserved pattern whose resource reservation is associated with the lowest data priority 572. In a similar example, if the WTRU's data has a lower data latency requirement than that associated with a reserved pattern resource, then the WTRU may then select a reserved pattern whose resource reservation is associated with a higher data latency requirement. In a further example, if the WTRU's data has higher data reliability requirement than that associated with a reserved pattern resource, then the WTRU may then select a reserved pattern whose resource reservation is associated with the lowest data reliability requirement. The WTRU may then proceed to transmit data using the selected pattern(s) 590.

If the comparison of QoS requirements does not favor the WTRU data, then the WTRU may not transmit the data at this time 573. In an example, the WTRU may then perform regular sensing procedures. For example, the WTRU may perform sensing not restricted to the configured pattern resources. Further, the WTRU may perform regular resource selection operations. Alternatively or additionally, the WTRU may request that the base station, such as a gNB, schedule resources for a sidelink transmission by the WTRU.

Figure 6:
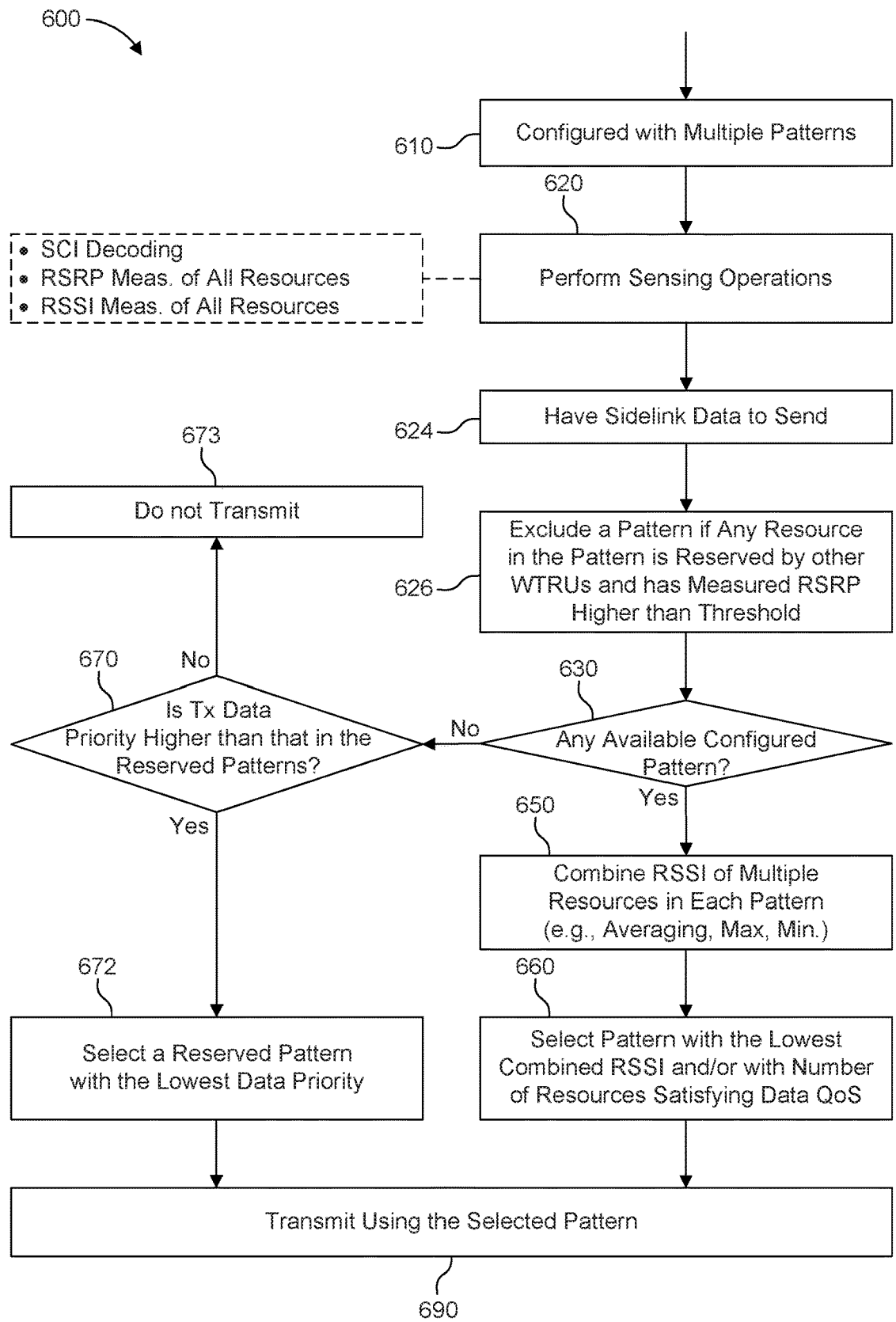
FIG. 6 is a flowchart diagram illustrating another example procedure of a WTRU selecting a pattern from a configured list for sidelink data transmission

FIG. 6 is a flowchart diagram illustrating another example procedure of a WTRU selecting a pattern from a configured list for sidelink data transmission. In the examples shown in flowchart diagram 600, the WTRU may be configured with patterns 610. Further, the WTRU may perform sensing operations on resources 620. In an example, the sensing operations may include decoding the SCI(s) of one or more other WTRUs' sidelink transmission(s). In a further example, the sensing operations may include measuring the RSRP level of one or more resources in each of multiple patterns. Also, the sensing operations may include measuring the RSSI value of one or more resources in each of the multiple patterns.

The WTRU may then have sidelink data to send 624. The WTRU may then exclude a pattern if any resource in the pattern is reserved by another WTRU and/or has an RSRP level greater than a threshold 626.

Accordingly, the WTRU may then determine whether any configured patterns are available 630. If configured patterns are available, the WTRU may then make a determination using the RSSIs of multiple resources of each available pattern 650. The determination may be made based on the average of the RSSIs, the minimum of the RSSIs, the maximum of the RSSIs, the worst value of the RSSIs, the best value of the RSSIs, the median of the RSSIs, the mode of the RSSIs or the like. The determination may result in a representative RSSI value for the pattern. Further, the WTRU may then select the pattern with the lowest representative RSSI value and/or the pattern with a number of resources which satisfy QoS requirements for the data 660. In an example, the WTRU may select the pattern with the lowest representative RSSI value whose characteristics satisfy the QoS requirements for the data. For example, the WTRU may select the pattern with the lowest representative RSSI value whose number of repetitions satisfies the data reliability requirements for the data. The WTRU may then proceed to transmit data using the selected pattern(s) 690.

If configured patterns are not available, the WTRU may then compare the QoS requirements of the data for transmission by the WTRU to the QoS requirements of the data in the reserved pattern resources. For example, the WTRU may determine if the priority of the data for transmission by the WTRU is higher than the priority of the data in the reserved pattern resources 670. In a similar example, the WTRU may determine if the data latency requirements of the data for transmission by the WTRU is higher than the data latency requirements of the data in the reserved pattern resources. In a further example, the WTRU may determine if the data reliability requirements of the data for transmission by the WTRU is higher than the data reliability requirements of the data in the reserved pattern resources.

If the comparison of QoS requirements favors the WTRU data, the WTRU may then select a reserved pattern with the least stringent QoS characteristics. For example, if the WTRU's data has higher priority than that associated with a reserved pattern resource, then the WTRU may then select a reserved pattern whose resource reservation is associated with the lowest data priority 672. In a similar example, if the WTRU's data has a lower data latency requirement than that associated with a reserved pattern resource, then the WTRU may then select a reserved pattern whose resource reservation is associated with a higher data latency requirement. In a further example, if the WTRU's data has higher data reliability requirement than that associated with a reserved pattern resource, then the WTRU may then select a reserved pattern whose resource reservation is associated with the lowest data reliability requirement. In an example, the other WTRU which had previously reserved the pattern may be informed that the pattern has been selected for use by the WTRU. For example, the WTRU may so inform the other WTRU directly. Additionally or alternatively, the WTRU may so inform the network, which may then in turn inform the other WTRU. The WTRU may then proceed to transmit data using the selected pattern(s) 690.

If the comparison of QoS requirements does not favor the WTRU data, then the WTRU may not transmit the data at this time 673. In an example, the WTRU may then perform regular sensing procedures.

In an example, a WTRU may measure an RSRP level and an RSSI value of one or more resources in each of a plurality of patterns. The WTRU may exclude, from the selection, each pattern for which at least one resource in the pattern is reserved by another WTRU and has an RSRP greater than a threshold. On a condition that at least one of the plurality of patterns is not excluded, the WTRU may select a pattern with a lowest pattern RSSI value and a one or more resources satisfying a QoS requirement of data of the WTRU. The WTRU may then transmit the data of the WTRU using the selected pattern.

In a further example, on on a condition that all of the plurality of patterns are excluded, the WTRU may select an excluded pattern associated with the lowest data priority, wherein the lowest data priority is lower than a priority of the data of the WTRU. Also, the WTRU may receive a configuration of the plurality of patterns, in a further example. Additionally or alternatively, the WTRU may be preconfigured with the plurality of patterns.

In another example, the WTRU may decode sidelink control information (SCI) of one or more other WTRUs. In an additional example, the plurality of patterns may be for sidelink transmission.

In an additional example, each pattern RSSI value of each the plurality of patterns may be a representative value of an associated pattern. Also, the pattern RSSI values may be determined based on an average of RSSI values for resources in the associated pattern. Further, the pattern RSSI values may be determined based on a maximum of RSSI values for resources in the associated pattern. Moreover, the pattern RSSI values may be determined based on a minimum of RSSI values for resources in the associated pattern.

Examples provided herein include handling large sized packets in a pattern or TFRP. In resource pool configurations, the resource time-frequency sizes and resource repetition number for each pattern may be configured. This configuration may be done without the knowledge of packet sizes. In NR V2X sidelink, the packet size may have large variations. For a configured size resource, the packets may be processed accordingly. There may be several approaches to handle the large-size packets, such as: limiting TB size and/or MCS values, code block group (CBG)-based transmissions, and/or selection of multiple patterns or TFRPs.

For the approach of limiting TB size and/or MCS values, a WTRU with a configured pattern or TFRP may restrict the size of a TB and/or MCS index. In an example, if the MCS index is determined based on channel conditions or other factors, then the TB size may be upper bounded following certain formulas. For example, the available pattern resource may have N REs for data transmissions, where the number of layers is L, the determined coding rate is R and the modulation order is M. Then the TB size may not be larger than:

$$S \leq N \cdot M \cdot R \cdot L \qquad \text{Equation (1)}$$

In one example, the TB size may be provided by a higher layer as S, then the MCS index (M, R) may be selected to match the pattern resources.

For the approach of CBG-based transmissions, if a higher layer specifies the TB size and MCS index such that a single pattern could not be large enough to carry the sidelink data, then the segmentation of the TB and the CBG-based transmission may be applied. The generation of CBGs may be performed in a way as to ensure that each CBG may fit in the resource of a pattern. The transmission and feedback may be based on CBGs. In one example, the CB size may be given by C bits, the available pattern resource may have N REs, the number of layers may be L, the determined coding rate may be R and the modulation order may be M. Then the number of CBs composing a CBG may be given by the largest integer K such that:

$$K \leq \frac{N \cdot M \cdot R \cdot L}{C}. \qquad \text{Equation (2)}$$

The last CBG may compose remainder CBs. HARQ feedback may be based on CBGs or may be based on a TB. For the CBG-based feedback, each HARQ feedback message or bit may correspond to a single CBG.

For the approach of the selection of multiple patterns or TFRPs, a WTRU may be configured with multiple patterns or TFRPs. In an example, a WTRU configured with multiple patterns may use more than one pattern to transmit a large-size packet. The simultaneous selection of multiple patterns may affect the general pattern selection procedure.

Figure 7:
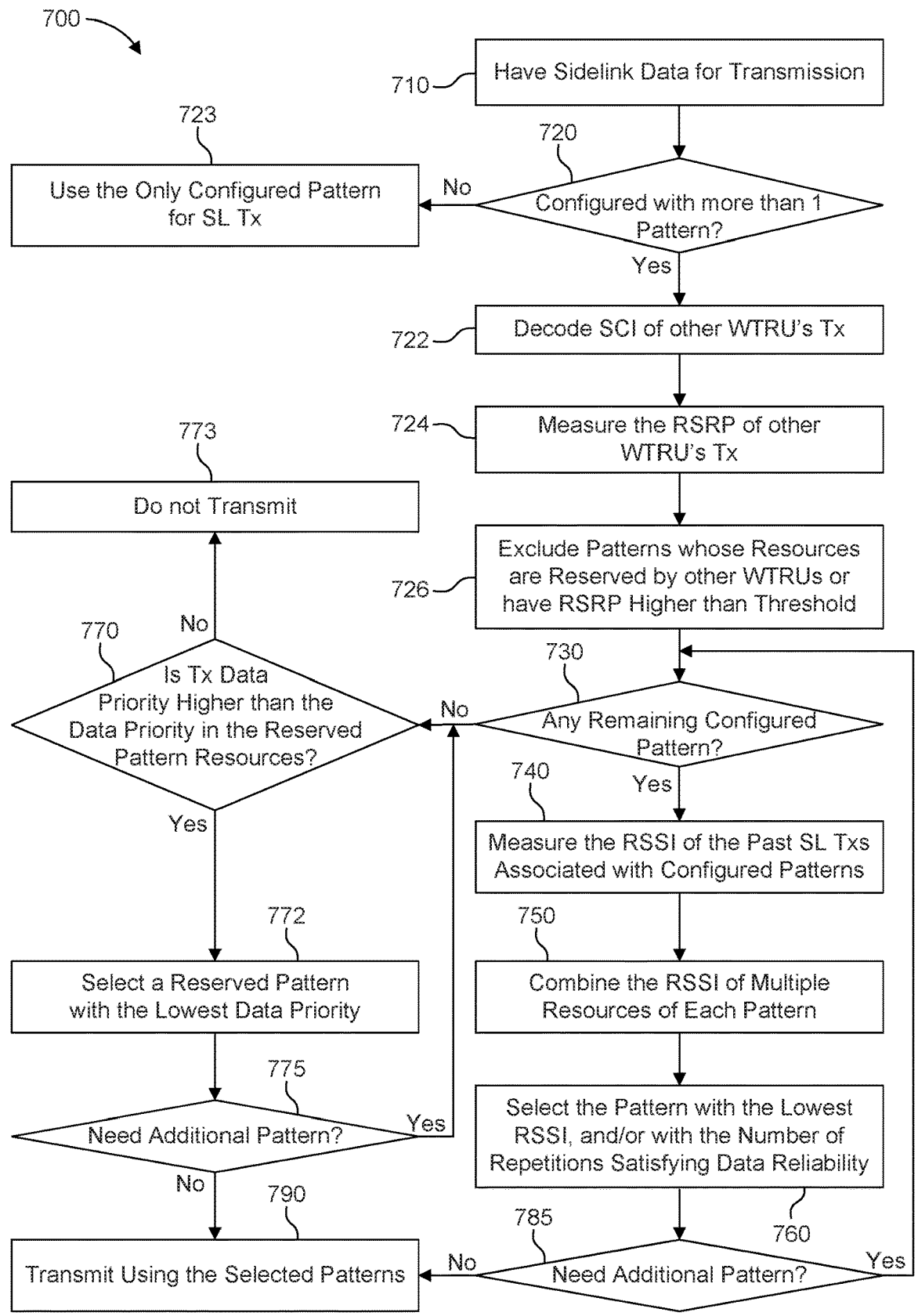
FIG. 7 is a flowchart diagram illustrating an example procedure of a WTRU selecting one or more patterns from a configured list for sidelink data transmission.

FIG. 7 is a flowchart diagram illustrating an example procedure of a WTRU selecting one or more patterns from a configured list for sidelink data transmission. In an example shown in flowchart diagram 700, a WTRU may have sidelink data for transmission 710. The WTRU will then determine if it has been configured with more than one pattern 720. If the WTRU has been configured with only one pattern, then then WTRU may use the only configured pattern for sidelink transmission 723. In an example, the WTRU may use the pattern without sensing.

If more than one pattern is configured, then the WTRU may perform sensing for the resources associated with the configured patterns. For example, the WTRU may decode the SCI(s) of one or more other WTRUs' sidelink transmission(s) 722. Accordingly, the WTRU may then determine which configured pattern resources are not available. As a result, the WTRU may exclude the patterns whose resources are reserved by other WTRU(s) from the list of configured patterns. Further, the WTRU may measure the RSRP level of transmission(s) one or more other WTRUs 724. As a result, the WTRU may exclude patterns whose resources are reserved by one or more other WTRU(s) or are used by WTRU(s) whose transmission(s) are higher than a threshold 726.

The WTRU may then determine if there are any remaining patterns 730. If there are still some remaining patterns in the configured pattern list, then the WTRU may measure the RSSI of the sensing window for the resources of the remaining pattern(s). For example, the WTRU may measure the RSSI of the past sidelink transmissions associated with the remaining patterns 740. The WTRU may then make a determination using the RSSIs of multiple resources of each pattern 750. The determination may be made based on the average of the RSSIs, the minimum of the RSSIs, the maximum of the RSSIs, the worst value of the RSSIs, the best value of the RSSIs, the median of the RSSIs, the mode of the RSSIs or the like. The determination may result in a representative RSSI value for the pattern. Further, the WTRU may then select the pattern with the lowest representative RSSI value and/or the pattern with a number of resources which satisfy QoS requirements for the data 760. In an example, the WTRU may select the pattern with the lowest representative RSSI value whose characteristics satisfy the QoS requirements for the data. For example, the WTRU may select the pattern with the lowest representative RSSI value whose number of repetitions satisfies the data reliability requirements for the data.

The WTRU may then determine if it needs one or more additional patterns 785. If the WTRU needs one or more additional patterns, the WTRU may then again determine if there are any remaining patterns 730, and proceed from that stage of the procedure. If the WTRU does not need an additional pattern, the WTRU may then proceed to transmit data using the selected pattern(s) 790.

If the WTRU determines there are no remaining patterns at step 730, the WTRU may then compare the QoS requirements of the data for transmission by the WTRU to the QoS requirements of the data in the reserved pattern resources. For example, the WTRU may determine if the priority of the data for transmission by the WTRU is higher than the priority of the data in the reserved pattern resources 770. In a similar example, the WTRU may determine if the data latency requirements of the data for transmission by the WTRU is higher than the data latency requirements of the data in the reserved pattern resources. In a further example, the WTRU may determine if the data reliability requirements of the data for transmission by the WTRU is higher than the data reliability requirements of the data in the reserved pattern resources.

If the comparison of QoS requirements favors the WTRU data, the WTRU may then select a reserved pattern with the least stringent QoS characteristics. For example, if the WTRU's data has higher priority than that associated with a reserved pattern resource, then the WTRU may then select a reserved pattern whose resource reservation is associated with the lowest data priority 772. In a similar example, if the WTRU's data has a lower data latency requirement than that associated with a reserved pattern resource, then the WTRU may then select a reserved pattern whose resource reservation is associated with a higher data latency requirement. In a further example, if the WTRU's data has higher data reliability requirement than that associated with a reserved pattern resource, then the WTRU may then select a reserved pattern whose resource reservation is associated with the lowest data reliability requirement.

The WTRU may then determine if it needs one or more additional patterns 775. If the WTRU needs one or more additional patterns, the WTRU may then compare the QoS requirements of the data for transmission by the WTRU to the QoS requirements of the data in the reserved pattern resources, and proceed from that stage of the procedure. For example, the WTRU may determine if the priority of the data for transmission by the WTRU is higher than the priority of the data in the reserved pattern resources 770, and proceed from that step of the procedure. If the WTRU does not need an additional pattern, the WTRU may then proceed to transmit data using the selected pattern(s) 790.

If the comparison of QoS requirements does not favor the WTRU data at step 770, then the WTRU may not transmit the data at this time 773. In an example, the WTRU may then perform regular sensing procedures.

In an example case, the selection of multiple patterns or TFRPs may not be independent. For example, one principle of selecting multiple TFRPs may be that the selected TFRPs occupy as few time units as possible. Such an example principle may avoid the half-duplex issue. For instance, consider the TFRP example in FIG. 4. The selection of TFRP1 and TFRP2 may be better than the selection of TFRP1 and TFRP4, since the former selection occupies 4 time units, while the latter selection occupies 5 time units.

Examples provided herein may employ a resource usage report. For example, between the first transmission and a retransmission, a WTRU may transmit a resource usage report by SCI or other type of feedback channel, data channel, or the like. The resource usage report may be a bitmap indicating whether the physical resource block (PRB) may undergo collision. For example, the resource usage report may indicate that higher energy has been detected. On reception of the resource usage report, the transmitting WTRU, which may have undergone collision in the previous transmission, may dynamically change its TFRP pattern or use frequency hopping. Note that the resource usage report may be the last symbol of each slot.

Figure 8:
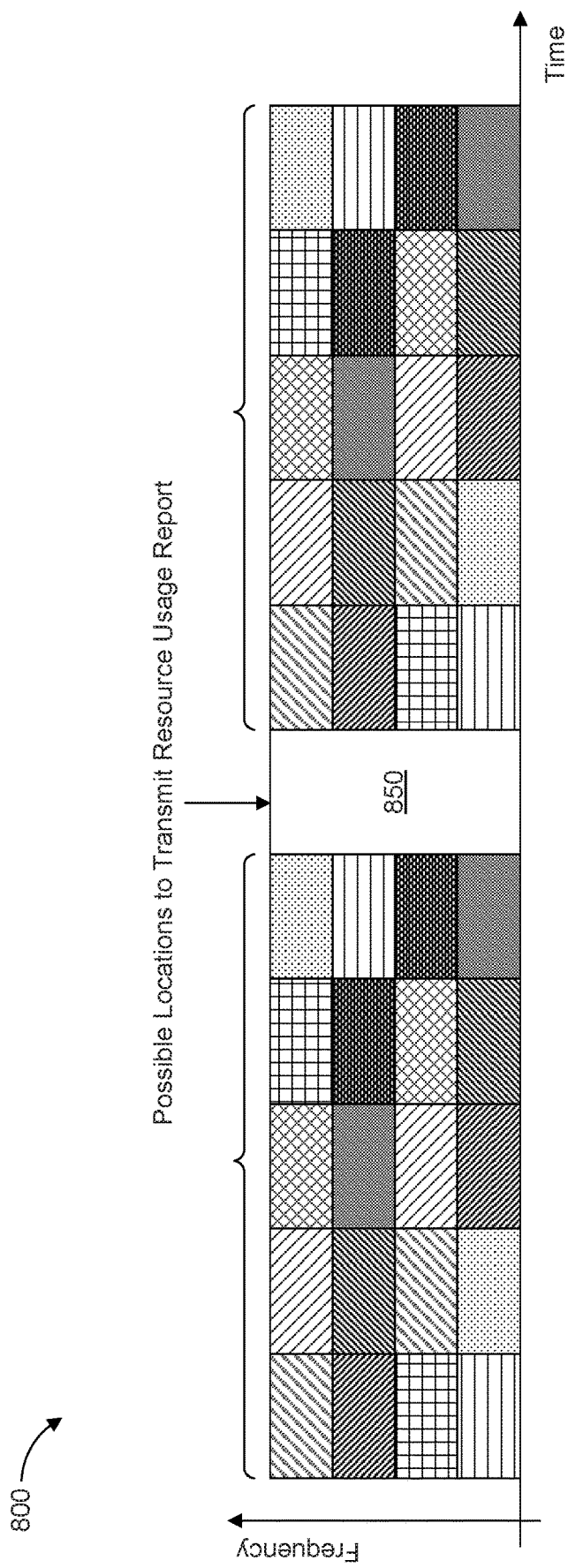
FIG. 8 is a wireless communications resource diagram illustrating an example resource usage report and indication.

FIG. 8 is a wireless communications resource diagram illustrating an example resource usage report and indication. In an example, a pattern or TFRP with a fixed number of repetitions may be used, as shown in resource diagram 800. The entire pattern may be repeated and a time gap 850 between repetitions of the pattern may be present. A WTRU, which may hear the transmission of a pattern or TFRP, may provide a resource usage report or PRB usage report in this gap 850. In a platoon use case, the resource usage report or PRB usage report or indication may be useful. For example, these may be useful in a scenario of communications within a group with a group leader or group manager. The group leader, group manager or gNB may configure the TFRP or pattern to group members. The group leader or group manager may monitor the transmission from the members in the group. Accordingly, after the transmission using a pattern or TFRP, the group leader or group manager may quickly report the resource usage. The group members may detect the resource usage report and determine whether the group may continue to use the same TFRP or pattern, or select a new TFRP or pattern. The decision may be made based on a resource usage report/indication. For example, if the report may show a collision on the desired resource, the WTRU may check the other possible TFRP(s) or pattern(s) to transmit data such that the collisions may be avoided or mitigated.

Figure 9:
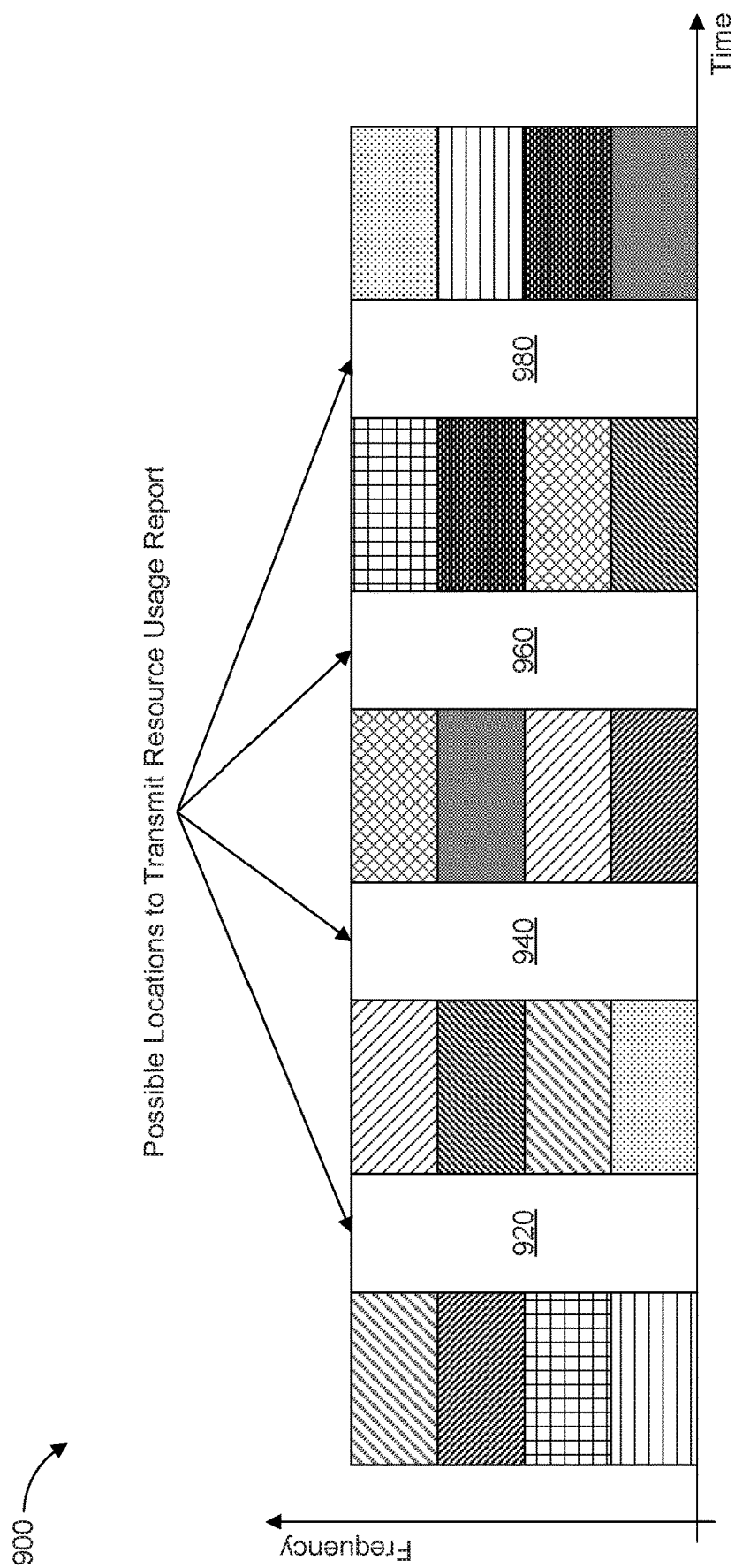
FIG. 9 is another wireless communications resource diagram illustrating another example resource usage report and indication.

FIG. 9 is another wireless communications resource diagram illustrating another example resource usage report and indication. Resource diagram 900 shows an example with more frequent resource usage report transmissions. In this example, within a TFRP or pattern, some transmission gaps may be inserted to allow a monitoring WTRU to transmit a resource usage report or resource usage indication. For example, transmission gaps 920, 940, 960, 980 may be inserted to allow a monitoring WTRU to transmit a resource usage report or resource usage indication.

Examples provided herein include a procedure for two-step collision mitigation pattern or TFRP. TFRPs or patterns may provide a solution to solve half-duplex issues. In another aspect, WTRUs using different patterns or TFRPs may have a chance to hear each other. However, hearing each other may not solve collision problems fully. In an example procedure, a two-step collision mitigation procedure with a TFRP or pattern for SCI may be used.

Figure 10:
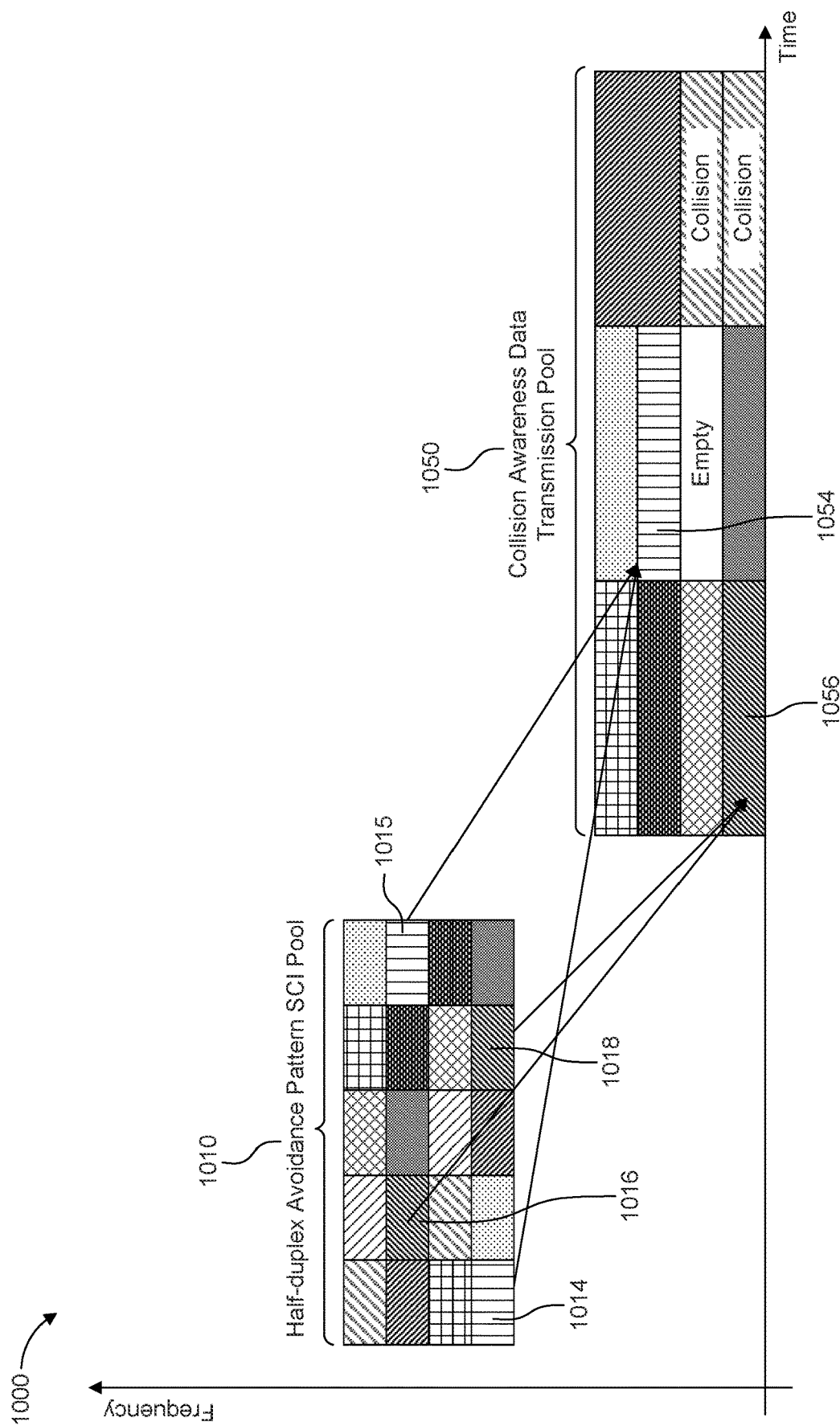
FIG. 10 a wireless communications resource and procedure diagram illustrating an example of using pattern scheduled sidelink control information (SCI) to reserve data transmission resources.

FIG. 10 is a wireless communications resource and procedure diagram illustrating an example of using pattern scheduled sidelink control information (SCI) to reserve data transmission resources. In an example procedure shown in resource and procedure diagram 1000, there may be two resource pools: a half-duplex avoidance SCI pool with a pattern or TFRP, and a collision awareness data transmission pool.

This collision mitigation pattern procedure may also include SCI transmission, where each WTRU may be configured or preconfigured with one or more patterns or TFRPs. A WTRU may select a TFRP from the list of configured or preconfigured TFRPs to transmit its SCI. The TFRP for the SCI may be designed such that all the WTRUs may have a chance to hear SCI messages from other WTRUs. The repetition transmission may be used for SCI to increase reliability and reduce collision. The SCI transmitted from WTRUs may have the same size and thus use the same size of resource units used for transmission.

SCI may contain one or more intended resource allocations for the PSSCH transmissions/retransmissions. This SCI may be similar to a booking message for reserving subsequent data transmission resources. The intended resource may be selected from the collision awareness data transmission pool.

In an example, the intended data transmission resources selected from two or more WTRUs may be fully or partially overlapped. This selection overlap may be partially addressed during the data transmission stage.

In a further example, two or more WTRUs may select the same TFRP for the WTRU's SCI transmissions. Then the SCI transmissions may collide. This SCI transmission collision may have less impact than the data transmission collision, since the wasted resource of SCI transmission may be smaller than that for data transmission.

This collision mitigation pattern procedure may also include data transmission. In an example, the resources in the collision awareness data transmission pool with successful scheduling may be used by the scheduled WTRUs. Further, the unscheduled resources and the resources in the collision awareness data transmission pool with collided scheduling may form a backup pool. Moreover, the WTRUs with unsuccessful scheduling may pick one or more resource units to transmit from the backup pool. In an example, WTRUs with unsuccessful scheduling may be WTRUs without scheduling. In a further example, WTRUs with unsuccessful scheduling may be WTRUs with collided scheduling.

In one example procedure for a WTRU, there may be three pools, and a WTRU may be configured with two of them. For example, the WTRU may be configured with the first two of them. The WTRU may be configured with a half-duplex avoidance SCI pool 1010 with a configured or preconfigured pattern or TFRP may be used for a resource booking/reservation type of SCI transmission. In an example, WTRUs using different patterns or TFRPs may hear each other. For example, one WTRU may receive transmissions meant for another WTRU.

The WTRU may also be configured with a collision awareness data transmission pool 1050, which may be used for data transmission. In an example, the pool 1050 may be used for data transmission including the WTRU's associated PSCCH and PSSCH.

In a further example, a backup pool may be used for data transmission for an unsuccessful WTRU. In an example, the pool may be used for data transmission including the unsuccessful WTRU's associated PSCCH and PSSCH. An unsuccessful WTRU may be the WTRU whose intended data transmission resource units may have collided with others. This pool may be formed after the WTRU monitors the transmission of resource booking/reservation type of SCIs from other WTRUs.

In an example, resource of pool 1050 with successful scheduling may be used by the scheduled WTRUs. Further, in pool 1050, resources of with collided scheduling or unscheduled resources may form a backup pool. A WTRU with unsuccessful scheduling may pick one or more resources to use for transmission from the backup pool. Further details of this example procedure are provided further below.

In a further example, the WTRU may select SCI resources based on one TFRP pattern in the half-duplex avoidance SCI pool. The selection of TFRP pattern may be based on sensing results. For example, the WTRU may sense the transmission over the carrier(s) for a certain duration, and notice the resources reserved for periodic transmission. The WTRU may try to avoid the periodically used resources. The WTRU may also perform short term sensing and notice which resource(s) may not be used in the moment. The WTRU may consider other conditions discussed herein and select a TFRP pattern.

In a further example, the WTRU may randomly select a TFRP pattern. Alternatively, a TFRP pattern may be selected/determined by a gNB or other WTRU. For example, the TFRP pattern may be selected/determined by the leading WTRU in a group.

The WTRU may transmit the intended resource allocation for the following data transmissions in the SCI. The intended resource allocation may be selected by the WTRU using sensing results in the collision awareness data transmission pool, in an example. In a further example, the intended resource allocation may be selected by the WTRU randomly in the collision awareness data transmission pool. In an additional example, the intended resource allocation may be associated with the location of SCI transmissions, SCI TFRP or pattern. For example, the WTRU that transmits SCI using TFRP pattern 1 may have the corresponding resources for data transmissions with or without frequency hopping.

In an example, in pool 1010, a first WTRU may select SCI resources 1014, 1015 of a first pattern, and a second WTRU may select SCI resources 1016, 1018 of a second pattern. In pool 1050, resource allocation 1054 may be associated with SCI resources 1014, 1015, and the first WTRU may use resource allocation 1054 for data transmission. Similarly, resource allocation 1056 may be associated with SCI resources 1016, 1018, and the second WTRU may use resource allocation 1054 for data transmission.

The WTRU may monitor the transmission in the half-duplex avoidance SCI pool when it may not transmit its SCI. By monitoring the SCI transmission from other WTRUs, the WTRU may know the resource usage in the WTRU's intended allocated resource unit, and the resource usage in other resource units by monitoring the SCI transmission from other WTRUs.

For the resource usage in the WTRU's intended allocated resource unit, the WTRU may use success resource units and collided resource units.

For the success resource units, if no other WTRU schedules to use the intended resource units, the resource units may be considered to be success resource units. The WTRU may transmit data in one or more success resource units. Further, the WTRU may mark itself as a successful WTRU, in an example.

For the collided resource units, if the intended resource units are used by one or more other WTRUs, the WTRU may consider the resource units as collided resource units. In an example, the WTRU may mark itself as an unsuccessful WTRU. Further, the WTRU may put the collided intended resource units in the backup pool. This method may be referred as a first method. Further, method may be referred as method A.

Additionally or alternatively, the WTRU may check the priority setting of the intended data transmission on one or more collided resource units. If the priority order of the WTRU is the highest, the WTRU may mark itself as a successful WTRU. The WTRU may transmit data in the intended resource unit. Otherwise, the WTRU may mark itself as an unsuccessful WTRU. This method may be referred as a second method. Further, the method may be referred as method B.

In the case of a partial collision, where allocated resource units have collision and the rest may not, the WTRU may split the resources and follow the rule for collided resources and not collided resources. In one method, the WTRU may mark itself as an unsuccessful WTRU and may be able to select resources from the backup pool later. In another method, the WTRU may mark itself as a successful WTRU and transmit on successfully scheduled resources.

In a further example, the WTRU may know about the resource usage in other resource units by monitoring SCI transmission from other WTRUs. Accordingly, the WTRU may use success resource units and collided resource units.

The WTRU may use success resource units. In an example, if one WTRU may schedule to use the resource units, the resource units may be considered as success resource units. The success resource units may belong to the WTRU that successfully scheduled transmission on them. The WTRU may not perform transmission on success resource units belonging to other WTRUs, in an example.

Further, the WTRU may use collided resource units. In an example, if more than one WTRUs schedules to use the resource units, the resource units may be considered as collided resource units. As discussed previously, if method A is used, then the WTRU may put the collided resource units in the backup pool. Further, if method B is used, the WTRU may not perform transmission on collided resource units.

In a further example, if no WTRU schedules to use the resource units, the resource units may be considered as unused resource units. The WTRU may put the unused resource units in the backup pool.

If the WTRU is an successful WTRU, the WTRU may transmit data on this scheduled resource units. If the WTRU is an unsuccessful WTRU, the WTRU may decide whether it may select resource units from backup pool to transmit. The decision may depend on a priority level of the data to be transmitted. For example, WTRUs with low priority data traffic may not be able to perform transmission using a backup pool. The resource selection on the backup pool may depend on sensing results. Additionally or alternatively, the WTRU may select the resource randomly.

In another example procedure for a WTRU, a feedback channel may be allocated between SCI transmission and data transmission. In an example, feedback may then be generated and the feedback channel may carry the feedback. In another example, the feedback channel may carry feedback generated before the allocation of the feedback channel. The feedback channel may carry an acknowledgement or a resource usage report from one WTRU to the group of WTRUs. A WTRU that does not perform a transmission in a previous SCI pool may transmit the feedback. For example, a group of WTRUs may have a group leader. The leading WTRU or group leader WTRU may schedule the two-step collision mitigation transmission for the group members. The leading WTRU may not perform SCI/data transmission and may provide feedback, for example, a resource usage/allocation report, for the group.

The feedback may include information such as one or more of resource status or WTRU status. In an example, the feedback may include a resource status for each resource unit indicating whether it is a success resource unit, collided resource unit, or unused resource unit. Additionally or alternatively, a backup pool may be included. In a further example, the feedback may include a WTRU status concerning a successful or unsuccessful WTRU. Further, the information may be implicit and may be abstracted from resource statues. Further, the WTRU procedure may be like one of the WTRU examples discussed herein, however, the WTRUs may determine resource status and WTRU status based on a feedback report.

In an example, a WTRU may perform frequency hopping to avoid collision for repetition transmissions. In 3GPP NR, ConfiguredGrantConfig may indicate a frequency hopping offset to be used for a WTRU. As disclosed herein, repetition transmissions may be further randomized using more frequency hopping offsets. To do this, ConfiguredGrantConfig may be modified to carry a set of frequency hopping offsets. The set of frequency hopping offsets may be expressed in a variety of forms. For example, a set of frequency hopping offsets may be expressed as {frequencyHoppingOffset1, . . . , frequencyHoppingOffsetN}.

A frequency hopping offset may be selected by a gNB or other WTRU(s) such as a leading WTRU in a group. Alternatively, the frequency hopping offset may be selected by the transmitting WTRU. In an example, the frequency hopping offset may be selected based on sensing results. In a further example, the frequency hopping offset may be selected randomly.

A frequency hopping offset may need to be signaled so that the receiving WTRU may know the expected location for the hopped transmission. In one example, the frequency hopping offset for the next transmission may be signaled in the current transmission.

Although the features and elements of the present invention are described in exemplary embodiments of particular combinations, each feature or element can be used alone without the other features and elements of the preferred embodiments or in various combinations with or without other features and elements of the present invention.

Although the solutions described herein consider New Radio (NR), 5G or LTE, LTE-A specific protocols, it is understood that the solutions described herein are not restricted to this scenario and are applicable to other wireless systems as well.

Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for performing a selection of a pattern in a wireless transmit/receive unit (WTRU), the method comprising:

measuring a reference signal received power (RSRP) level and a received signal strength indicator (RSSI) value of one or more resources in each of a plurality of patterns;

excluding, from the selection, each pattern for which at least one resource in the pattern is reserved by another WTRU and has an RSRP greater than a threshold;

selecting a pattern, wherein, on a condition that at least one of the plurality of patterns is not excluded, the selected pattern has a lowest pattern RSSI value and one or more resources satisfying a plurality of quality of service (QOS) requirements of data of the WTRU, wherein each pattern RSSI value of each of the plurality of patterns is a representative value of an associated pattern, and wherein the pattern RSSI values are determined based on a maximum of RSSI values for resources in the associated pattern; and transmitting data of the WTRU using the selected pattern.

2. The method of claim 1, wherein, on a condition that all of the plurality of patterns are excluded, the selected pattern is an excluded pattern associated with a lowest data priority, wherein the lowest data priority is lower than a priority of the data of the WTRU.

3. The method of claim 1, further comprising:
receiving a configuration of the plurality of patterns.

4. The method of claim 1, wherein the WTRU is preconfigured with the plurality of patterns.

5. The method of claim 1, further comprising:
decoding sidelink control information (SCI) of one or more other WTRUs.

6. The method of claim 1, wherein the resources of the plurality of patterns are for sidelink transmission.

7. A wireless transmit/receive unit (WTRU) for performing a selection of a pattern, the WTRU comprising:
a processor; and
a transceiver operatively connected to the processor; wherein:

the processor and the transceiver are configured to measure a reference signal received power (RSRP) level and a received signal strength indicator (RSSI) value of one or more resources in each of a plurality of patterns;

the processor is configured to exclude, from the selection, each pattern for which at least one resource in the pattern is reserved by another WTRU and has an RSRP greater than a threshold;

the processor is configured to select a pattern, wherein, on a condition that at least one of the plurality of patterns is not excluded, the selected pattern has a lowest pattern RSSI value and one or more resources satisfying a plurality of quality of service (QOS) requirements of data of the WTRU, wherein each pattern RSSI value of each of the plurality of patterns is a representative value of an associated pattern, and wherein the pattern RSSI values are determined based on a maximum of RSSI values for resources in the associated pattern; and the transceiver is configured to transmit data of the WTRU using the selected pattern.

8. The WTRU of claim 7, wherein, on a condition that all of the plurality of patterns are excluded, the selected pattern is an excluded pattern associated with a lowest data priority, wherein the lowest data priority is lower than a priority of the data of the WTRU.

9. The WTRU of claim 7, wherein the transceiver is further configured to receive a configuration of the plurality of patterns.

10. The WTRU of claim 7, wherein the WTRU is preconfigured with the plurality of patterns.

11. The WTRU of claim 7, wherein the processor and the transceiver are further configured to decode sidelink control information (SCI) of one or more other WTRUs.

12. The WTRU of claim 7, wherein the resources of the plurality of patterns are for sidelink transmission.

* * * * *